United States Patent
Ishii et al.

(10) Patent No.: US 9,231,335 B2
(45) Date of Patent: Jan. 5, 2016

(54) CONNECTION STRUCTURE FOR SOLAR POWER GENERATION MODULE

(75) Inventors: Tadayuki Ishii, Tokyo (JP); Hiroaki Furukawa, Tokyo (JP); Hiroyuki Kono, Tokyo (JP)

(73) Assignee: ASAHI KASEI CHEMICALS CORPORATION, Tokyo (JP)

( * ) Notice: Subject to any disclaimer, the term of this patent is extended or adjusted under 35 U.S.C. 154(b) by 0 days.

(21) Appl. No.: 13/983,944

(22) PCT Filed: Feb. 13, 2012

(86) PCT No.: PCT/JP2012/053301
§ 371 (c)(1),
(2), (4) Date: Oct. 8, 2013

(87) PCT Pub. No.: WO2012/111628
PCT Pub. Date: Aug. 23, 2012

(65) Prior Publication Data
US 2014/0170900 A1    Jun. 19, 2014

(30) Foreign Application Priority Data
Feb. 14, 2011  (JP) ................. 2011-028870

(51) Int. Cl.
| | | |
|---|---|---|
| H01L 31/048 | (2014.01) | |
| H01R 13/00 | (2006.01) | |
| H01R 13/527 | (2006.01) | |
| H02S 40/34 | (2014.01) | |
| H01R 13/627 | (2006.01) | |

(52) U.S. Cl.
CPC ............ *H01R 13/527* (2013.01); *H02S 40/34* (2014.12); *H01R 13/6273* (2013.01)

(58) Field of Classification Search
CPC ...................................... C08K 5/523
USPC ...................................... 524/127
See application file for complete search history.

(56) References Cited

U.S. PATENT DOCUMENTS

| | | | |
|---|---|---|---|
| 5,159,027 A | 10/1992 | Kanayama et al. | |
| 5,214,109 A | 5/1993 | Gallucci et al. | |
| 5,216,089 A | 6/1993 | Gallucci et al. | |
| 5,397,822 A * | 3/1995 | Lee, Jr. ...................... | 524/127 |
| RE35,695 E | 12/1997 | Kanayama et al. | |
| 7,541,399 B2 * | 6/2009 | Yoshida ................. | C08L 25/06 524/127 |
| 2003/0125430 A1* | 7/2003 | Adedeji et al. ............. | 524/115 |
| 2005/0080185 A1* | 4/2005 | Mhetar ....................... | 524/494 |
| 2008/0190477 A1 | 8/2008 | Hattori | |
| 2008/0203366 A1 | 8/2008 | Blackburn et al. | |
| 2011/0232963 A1 | 9/2011 | Kono et al. | |

FOREIGN PATENT DOCUMENTS

| | | |
|---|---|---|
| EP | 0 257 486 A1 | 8/1987 |
| EP | 2 360 210 A1 | 10/2009 |
| JP | 59-059724 A | 4/1984 |
| JP | 63-301222 A | 12/1988 |
| JP | 2-276823 A | 11/1990 |
| JP | 5-1253 A | 1/1993 |
| JP | 9-227774 A | 9/1997 |
| JP | 10-087984 A | 4/1998 |
| JP | 63-108059 A | 5/1998 |
| JP | 2001-139798 A | 5/2001 |
| JP | 2004-137450 A | 5/2004 |
| JP | 3735966 B | 11/2005 |
| JP | 2006-299235 A | 11/2006 |
| JP | 2008-274035 A | 11/2008 |
| JP | 2009-197196 A | 9/2009 |
| JP | 2010-123933 A | 4/2010 |
| JP | 2010-519389 A | 6/2010 |
| JP | 2011-252097 A | 12/2011 |
| WO | 2005-117141 A1 | 12/2005 |
| WO | 2010/047122 A1 | 4/2010 |

OTHER PUBLICATIONS

ASTM D256 Standard Test Method for Determining the Izod Pendulum Impact Resistance of Plastics, May 1, 2010.*
Search Report from International Application No. PCT/J132012/065726, mail date is Sep. 25, 2012.
Search report from International Application No. PCT/JP2012/053301, mail date is Apr. 3, 2012.

* cited by examiner

*Primary Examiner* — Randy Gulakowski
*Assistant Examiner* — Christopher M Rodd
(74) *Attorney, Agent, or Firm* — Greenblum & Bernstein, P.L.C.

(57) ABSTRACT

A main object of the present invention is to provide a connection structure for a solar power generation module that has much better impact resistance at low temperature and flame retardancy even when made thinner and more compact. A connection structure for a solar power generation module according to the present invention is a connection structure for a solar power generation module, which links a solar power generation module with a cable for connecting to the solar power generation module, and includes a specific thermoplastic resin composition.

13 Claims, 1 Drawing Sheet

CONNECTION STRUCTURE FOR SOLAR POWER GENERATION MODULE

TECHNICAL FIELD

The present invention relates to a connection structure for a solar power generation module.

BACKGROUND ART

In a solar power generation module (hereinafter, sometimes referred to simply as "module") that converts solar light energy into electricity, a connection structure, such as a junction box or a connector, is provided in each module for connecting a cable between modules in order to extract the electricity in a useful form. A bypass diode, for example, is arranged in the junction box, so that even if the output of a module has decreased because the surface of a solar power generation module is partially in shadow, or a battery cell is broken, the effect of such a problem can be minimized. In this case, since the bypass diode generates heat, the whole junction box needs to be heat resistant. Proposed countermeasures against this heat generation have included increasing the number of diodes, attaching a metal heat sink in order to conduct the heat away, and dissipating the heat by increasing the volume of the junction box (e.g., refer to Patent Documents 1 and 2).

As the material forming the connection structure, such as a junction box and a connector, a thermoplastic resin may be used, for example.

Since solar power generation modules are often placed outside, the thermoplastic resin forming the connection structure, such as a junction box and a connector, not only needs to have the performance that is conventionally required for electrical and electronic component applications, such as electrical insulating properties typified by anti-tracking performance, and excellent flame retardancy, mechanical properties, impact properties, water resistance, chemical resistance, and dimensional stability, but also have impact strength at low temperatures.

Further, since the length of service of solar power generation modules is increasing, it is now important for the thermoplastic resin forming the connection structure, such as a junction box and a connector, to have thermal aging resistance properties (properties that maintain performance when exposed for a long duration to a high-temperature usage environment). In addition, the connection structure, such as a junction box and a connector, needs to have a good design and to be space saving.

In response to such needs, a connection structure for a solar power generation module has been proposed that has excellent impact properties at low temperature and long-term heat resistance even when being made thinner and more compact (e.g., refer to Patent Document 3).

LIST OF PRIOR ART DOCUMENTS

Patent Document

Patent Document 1: International Publication No. WO 2005/117141 Pamphlet
Patent Document 2: Japanese Utility Model Laid-Open No. 5-1253
Patent Document 3: Japanese Patent Laid-Open No. 2010-123933

SUMMARY OF INVENTION

Problems to be Solved by Invention

However, in some cases the material forming a conventional connection structure for a solar power generation module, for example, a thermoplastic resin such as polycarbonate (hereinafter sometimes referred to as "PC") and a modified polyphenylene ether (hereinafter sometimes referred to as "modified PPE"), has not had sufficient properties. Specifically, although PC has high impact resistance, there are limitations on its humidity resistance and chemical resistance, and although modified PPE has high humidity resistance, its impact resistance can hardly be said to exhibit a sufficient performance.

Further, the global spread of solar power generation systems is expanding, which means that there is a wider range of environments in which solar power generation modules are being used. Consequently, the connection structure for the solar power generation module is being used under harsher conditions than previously (higher temperatures, lower temperatures, higher humidity etc.). When the connection structure for the solar power generation module is used in a cold region, for example, higher impact strength at low temperature is required. On the other hand, although the demands for a thinner and more compact connection structure for a solar power generation module are becoming stronger, the above-described properties and flame retardancy need to be excellent even when the connection structure is thinner and more compact.

However, a conventional connection structure for a solar power generation module does not have sufficient impact resistance at low temperature or flame retardancy when made thinner and more compact.

Accordingly, the main object of the present invention, which has been created in view of the above-described circumstances, is to provide a connection structure for a solar power generation module that has much better impact resistance at low temperature and flame retardancy even when made thinner and more compact.

Means for Solving Problems

As a result of intensive studies to solve the above problems, the present inventors have discovered that the above-described problems can be resolved by a connection structure for a solar power generation module, which links a solar power generation module with a cable for connecting to the solar power generation module, wherein the connection structure for the solar power generation module contains a specific thermoplastic resin composition, thereby completing the present invention.

Specifically, the present invention relates to the following.

[1]

A connection structure for a solar power generation module, which links a solar power generation module with a cable for connecting to the solar power generation module, wherein
the connection structure comprises a thermoplastic resin composition,
the thermoplastic resin composition comprises (A) a polyphenylene ether-based resin, (B) a hydrogenated block copolymer, and (C) a flame retardant,
in the thermoplastic resin composition, based on a total of 100 parts by mass of (A) and (B), a content of (A) is 70 to 85 parts by mass, a content of (B) is 15 to 30 parts by mass, and a content of (C) is 5 to 30 parts by mass, and
the thermoplastic resin composition has a Charpy impact strength at −40° C. of more than 15 kJ/m$^2$.

[2]

A connection structure for a solar power generation module, which links a solar power generation module with a cable for connecting to the solar power generation module, wherein the connection structure comprises a thermoplastic resin composition, the thermoplastic resin composition comprises (A) a polyphenylene ether-based resin, (B) a hydrogenated block copolymer, and (C) a flame retardant, in the thermoplastic resin composition, based on a total of 100 parts by mass of (A) and (B), a content of (A) is 70 to 85 parts by mass, a content of (B) is 15 to 30 parts by mass, and a content of (C) is 5 to 30 parts by mass, and the thermoplastic resin composition does not dissolve after being dipped for 24 hours in an aqueous solution of 25 mass % ammonia at a 23° C.

[3]

The connection structure for the solar power generation module according to [1] or [2], wherein (C) is a phosphate-based compound represented by the following general formula (I) or (II),

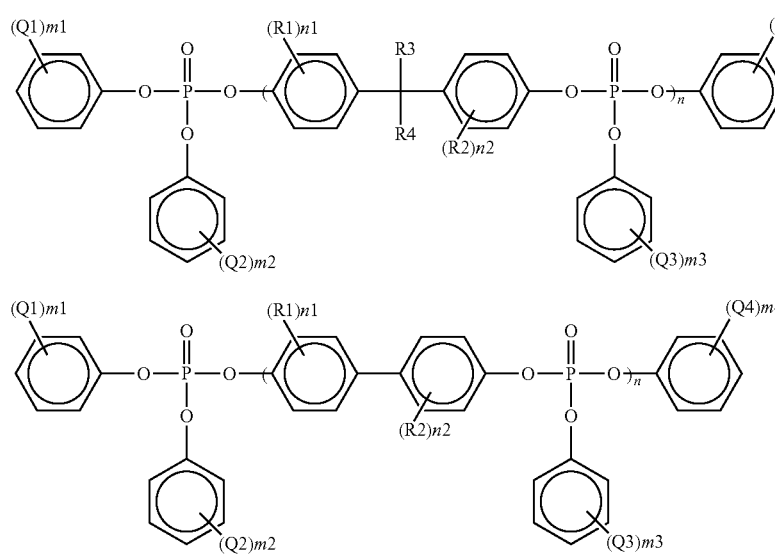

wherein in general formulae (I) and (II),

Q1, Q2, Q3, and Q4 are a substituent respectively and each independently represent an alkyl group having 1 to 6 carbon atoms, R1 and R2 are a substituent respectively and represent a methyl group, R3 and R4 each independently represent a hydrogen atom or a methyl group, n denotes an integer of 1 or more, n1 and n2 each independently denote an integer from 0 to 2, and m1, m2, m3, and m4 each independently denote an integer from 0 to 3.

[4]

The connection structure for the solar power generation module according to any of [1] to [3], wherein (B) has a number average molecular weight of 150,000 to 500,000, and is dispersed in the thermoplastic resin composition as a particle, and has a weight average particle size of 0.3 to 1 μm.

[5]

The connection structure for the solar power generation module according to any of [1] to [4], wherein in the thermoplastic resin composition, based on a total of 100 parts by mass of (A) and (B), the content of (A) is 75 to 85 parts by mass and the content of (B) is 15 to 25 parts by mass.

[6]

The connection structure for the solar power generation module according to any of [1] to [5], wherein in the thermoplastic resin composition, based on a total of 100 parts by mass of (A) and (B), the content of (C) is 15 to 25 parts by mass.

[7]

The connection structure for the solar power generation module according to any of [1] to [6], wherein a UL-94 standard flame retardancy level at a thickness of 0.75 to 3.0 mm of the thermoplastic resin composition is rank V-1 or higher.

[8]

The connection structure for the solar power generation module according to any of [1] to [7], wherein a UL-94 standard flame retardancy level at a thickness of 0.75 to 3.0 mm of the thermoplastic resin composition is rank V-0.

[9]

The connection structure for the solar power generation module according to any of [1] to [8], wherein the thermoplastic resin composition has a Charpy impact strength at 23° C., after being left for 500 hours under a 120° C. environment, of 20 kJ/m² or more.

[10]

The connection structure for the solar power generation module according to any of [1] to [9], wherein the thermoplastic resin composition has a Charpy impact strength retention rate at 23° C., after being left for 500 hours under a 120° C. environment, of 50% or more based on the Charpy impact strength at 23° C. of the thermoplastic resin composition before being left.

[11]

The connection structure for the solar power generation module according to any of [1] to [10], wherein the thermoplastic resin composition has a Charpy impact strength retention rate at 23° C., after being left for 2,000 hours under a 85° C., 85% relative humidity environment, of 70% or more based on the Charpy impact strength at 23° C., of the thermoplastic resin composition before being left.

[12]

The connection structure for the solar power generation module according to any of [1] to [11], wherein the thermoplastic resin composition has a comparative tracking index (CTI) based on UL-746A (ASTM D3638) at a thickness of 3.0 mm of 2 or less.

[13]

The connection structure for the solar power generation module according to any of [1] to [12], wherein the thermoplastic resin composition has a comparative tracking index (CTI) based on UL-746A (ASTM D3638) at a thickness of 3.0 mm of 1 or less.

[14]

The connection structure for the solar power generation module according to any of [1] to [13], wherein the connection structure for the solar power generation module is a connector for a solar power generation module.

[15]

The connection structure for the solar power generation module according to any of [1] to [14], wherein the thermoplastic resin composition comprises a thermoplastic resin composition obtained by crushing a connection structure for a solar power generation module.

Advantages of Invention

According to the present invention, provided is a connection structure for a solar power generation module that has much better impact resistance at low temperature and flame retardancy even when made thinner and more compact.

MODE FOR CARRYING OUT INVENTION

Figure 1:
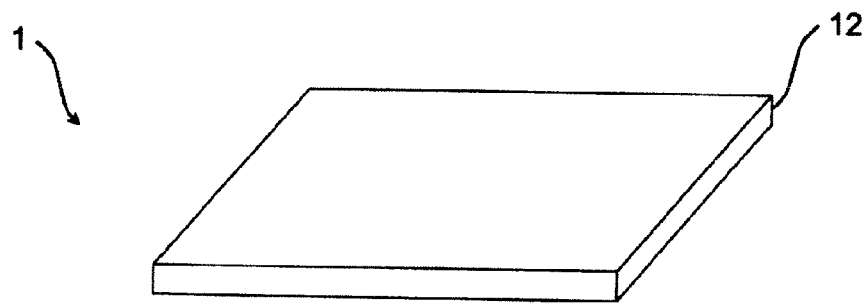
FIG. 1 is a simplified perspective view of an example of a connection structure according to the present invention.

An embodiment for carrying out the present invention (hereinafter, referred to simply as "present embodiment") will now be described in more detail. The following present embodiment is an illustrative example for describing the present invention, and does not limit the present invention to what is described below. The present invention may be carried out with various appropriate modifications made within the scope thereof. Further, the dimension ratios in the drawings are not limited to those that are illustrated.

<Connection Structure for Solar Power Generation Module>

The connection structure for the solar power generation module (hereinafter also referred to simply as "connection structure") according to the present embodiment is a connection structure for a solar power generation module, which links a solar power generation module with a cable for connecting to the solar power generation module, which contains a specific thermoplastic resin composition that has a Charpy impact strength at −40° C. of more than 15 kJ/m².

FIG. 1 is a simplified perspective view of an example (connection structure 1) of a connection structure according to the present embodiment. The connection structure 1 contains a box-like body 10 whose upper face is open and a lid 12 that covers the opening of the body 10. The connection structure 1 can be used as a junction box for a solar power generation module (hereinafter sometimes referred to simply as "junction box") that houses a bypass diode, a backflow prevention diode (not illustrated) and the like in the body 10. The body 10 contains a connection portion 102 with a solar power generation module cable and a connection portion 104 with an external connection cable. The connection structure 1 links the solar power generation module with the external connection cable and the like. Consequently, power generated by the solar power generation module can be distributed to an external device and the like. The number of cables that are linked may be one or two or more, and the linking destination is also not limited. Here, the configuration of the connection structure 1 is not especially limited, as long as it is a structure that is capable of housing at least a solar power generation module. The connection structure 1 does not have to have a configuration in which the body 10 and the lid 12 are separate, like in FIG. 1. The shape and the like of the connection structure 1 are not especially limited, and may be appropriately selected in consideration of the size and shape of the module, the usage environment and the like.

The connection structure according to the present embodiment uses a thermoplastic resin composition that has a Charpy impact strength at −40° C. of more than 15 kJ/m². Accordingly, the connection structure can be thinner than conventionally, and a connection structure can be obtained that has excellent impact resistance at low temperature while also being thinner and more compact. Consequently, for example, improvements in design and space savings can be achieved in the connection structure 1. As a preferred aspect of the connection structure 1, the connection structure 1 preferably has an average thickness of 3 mm or less, and more preferably 1 mm to 2.5 mm. By having a thin thickness with an average thickness of 2.5 mm or less, limitations on the arrangement space can be avoided and production costs can substantially reduced. By setting the average thickness to 1 mm or more, a good balance can be achieved among strength, long-term heat resistance, fluidity, and impact resistance during low temperatures, so that long-term heat resistance against the heat generated by the diodes can be maintained.

Here, the average thickness of the connection structure 1 refers to, on the body 10 and the lid 12, the average of the thicknesses of the flat faces and/or curved faces of the main surface areas, including the top face, the bottom face, and the wall faces. For example, for the below-described connector, the average thickness is the average of the thicknesses of the flat faces and/or curved faces of the main surface areas of a socket portion that has a cylindrical shape or a square tubular shape. Therefore, the thickness of local parts, such as a rib, a diode attachment portion, a slit for engaging, and a claw for engaging are not included in the average thickness.

An example of a preferred aspect of the connection structure according to the present embodiment is a junction box for a solar power generation module like the above-described connection structure 1. If the connection structure is a junction box, it is especially preferred that the average thickness thereof is 1 mm to 2.5 mm. In the present embodiment, a junction box can be obtained that is thinner than conventionally, and a junction box can be obtained that has excellent long-term heat resistance and impact resistance at low temperature while also being thinner and more compact.

Conventionally, with a junction box having the above-described average thickness, it was difficult to maintain a good balance among strength, long-term heat resistance, fluidity, impact resistance during low temperatures and the like, which especially meant that long-term heat resistance against the heat generated by the diodes could not be sufficiently maintained. Even when a junction box having the above-described average thickness is used as a connection structure, the connection structure according to the present embodiment can maintain a good balance among strength, long-term heat resistance, fluidity, and impact resistance during low temperatures, and especially can sufficiently maintain long-term heat resistance.

Figure 2:
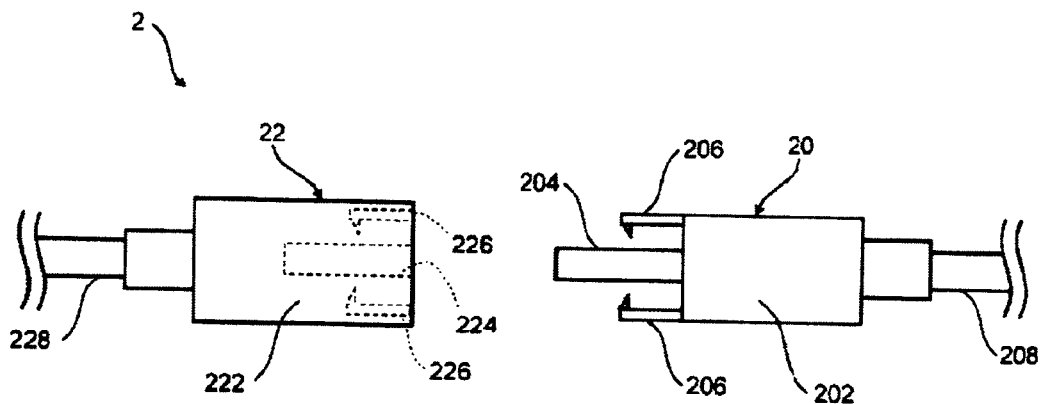
FIG. 2 is a simplified top view of another example of a connection structure according to the present invention.

FIG. 2 is a simplified top view of another example (connection structure 2) of a connection structure according to the present embodiment. The connection structure 2 contains a male first connector 20 and a female second connector 22. Thus, another preferred aspect of the connection structure according to the present embodiment can be configured from a connector for a solar power generation module (hereinafter sometimes referred to simply as "connector") like the connection structure 2. In the connection structure 2, the first connector 20 contains a socket portion 202, a connection terminal 204 that protrudes from the socket portion 202, a lock portion 206 formed facing the connection direction with the connector 22, and a cable 208 connected to the socket portion 202. The second connector 22 contains a socket portion 222 and a cable 228 connected to the socket portion 222. On the socket portion 222 of the second connector 22 are formed an engagement hole 224 that engages with the connection terminal 204 of the first connector 20 and a lock receiving portion 226 that engage with the lock portion 206 of the first connector 20. The first connector 20 and the second connector 22 can be connected by inserting and engaging the lock portion 206 of the first connector 20 into and with the lock receiving portion 226 of the second connector 22 while inserting the connection terminal 204 of the first connector 20 into the engagement hole 224 of the second connector 22.

In the connection structure 2, the shape of the first connector 20 and the second connector 22 is not limited. For example, the socket portion 202 of the first connector 20 and the socket portion 204 of the second connector 22 may have a cylindrical shape or a square tubular shape. The configuration of the first connector 20 and the second connector 22 is not limited. For example, a plurality of connection terminals 204 may be formed on the socket portion 202 of the first connector 20, and a plurality of engagement holes 224 may be formed in the socket portion 222 of the second connector 22. Further, either of the first connector 20 and the second connector 22 may be a positive electrode connector or a negative electrode connector.

As described above, if the connection structure is a connector, it is especially preferred that the average thickness thereof is 0.5 mm to 2.5 mm. In the present embodiment, a connector can be obtained that is thinner than conventionally. Further, a connector can be obtained that has excellent long-term heat resistance and impact resistance at low temperature while also being thinner and more compact. Especially, conventionally, with a connector having the above-described average thickness, it was difficult to maintain a good balance among strength, long-term heat resistance, fluidity and the like while sufficiently maintaining impact resistance during low temperatures. However, even when a connector having the above-described average thickness is used as a connection structure, the connection structure according to the present embodiment can maintain a good balance among strength, long-term heat resistance, fluidity and the like while sufficiently maintaining impact resistance during low temperatures, and can especially maintain long-term heat resistance.

(Impact Resistance at Low Temperature)

The connection structure used in a solar power generation module is normally expected to be used for a period of from about several months to 20 years, and even to be used for a long duration of about 30 years.

Considering that the connection structure according to the present embodiment may be used outside in a low-temperature environment, the thermoplastic resin composition contained in the connection structure needs to have a impact resistance at low temperature that is sufficient to prevent cracks from forming even when struck by a flying object. From such a perspective, the Charpy impact strength at $-40°$ C. of the thermoplastic resin composition used in the present embodiment is more than 15 kJ/m$^2$, preferably 17.0 kJ/m$^2$ or more, and more preferably 20 kJ/m$^2$ or more. Although the upper limit of this Charpy impact strength is not limited, it may be 30 kJ/m$^2$, for example.

In the present embodiment, the Charpy impact strength is a value measured by forming a notch based on ISO 179.

If the Charpy impact strength at $-40°$ C. decreases, cracks tend to occur more easily especially under a low-temperature environment, which means that the thickness has to be made thicker as a countermeasure. Consequently, limitations are placed on the degree of design freedom, the space saving properties, and in terms of costs.

Since the connection structure according to the present embodiment has a Charpy impact strength at $-40°$ C. of the thermoplastic resin composition that is within the above-described range, it is difficult for cracks to form, especially under a low-temperature environment. This means that the thickness can be decreased, which is advantageous in terms of the degree of design freedom, space saving properties, and costs.

To increase the Charpy impact strength at $-40°$ C. to more than 15 kJ/m$^2$, it is preferred that the thermoplastic resin composition contains an elastomer component, such as the hydrogenated block copolymer described below. The above-described Charpy impact strength at $-40°$ C. can be achieved by controlling the amount of the elastomer component, its dispersion state in the composition (the weight average particle size when dispersed as a particle, hereinafter also referred to as "dispersed particle size"), and the degree of degradation.

It is especially preferred that the dispersed particle size of the elastomer component is 0.3 μm or more. Means that can be used to achieve an elastomer component dispersed particle size of 0.3 μm or more may include, for example, reducing the melt viscosity of the thermoplastic resin (by adjusting the molecular weight, adding a plasticizer etc.), and preventing the elastomer from degrading (by reducing the temperature during melt kneading, reducing the oxygen concentration etc.) and the like.

(Thermal Aging Resistance, Humidity Resistance)

In addition, it is desirable for the connection structure used in a solar power generation module to maintain its performance for about 30 years even when used outside. It is especially important in terms of practical use as a solar power generation module to maintain impact strength after exposure to a high-temperature environment and a high-humidity environment over a long period of time. However, in the present embodiment, since it is practically difficult to determine the actual properties of a material under a long-term usage environment, the impact resistance under a high-temperature environment and a high-humidity environment is determined based on evaluation carried out by an accelerated test.

For example, the retention rate of the Charpy impact strength at 23° C. after the thermoplastic resin composition used in the present embodiment has been left for 500 hours under a 120° C. environment is, based on the Charpy impact strength at 23° C. of the thermoplastic resin composition before being left, preferably 50% or more, more preferably 60% or more, and still more preferably 70% or more. Although the upper limit of the retention rate of this Charpy impact strength is not especially limited, it may be, for example, 100%. If this retention rate is within the above-described range, the connection structure according to the present embodiment has excellent thermal aging resistance.

The retention rate can be measured by the method described in the following Examples.

Further, the retention rate of the Charpy impact strength at 23° C. after the thermoplastic resin composition used in the present embodiment has been left for 1,000 hours under a 120° C. environment is, based on the Charpy impact strength at 23° C. of the thermoplastic resin composition before being left, preferably 30% or more, more preferably 40% or more, and still more preferably 50% or more. Although the upper limit of the retention rate of this Charpy impact strength is not especially limited, it may be, for example, 100%. If this retention rate is within the above-described range, the connection structure according to the present embodiment has especially excellent thermal aging resistance.

The retention rate can be measured by the method described in the following Examples.

In addition, the Charpy impact strength at 23° C. after the thermoplastic resin composition used in the present embodiment has been left for 500 hours under a 120° C. environment is preferably 20 kJ/m$^2$ or more, more preferably 25 kJ/m$^2$ or more, and even more preferably 30 kJ/m$^2$ or more. Although the upper limit of this Charpy impact strength is not especially limited, it may be, for example, 60 kJ/m$^2$. If this Charpy impact strength is within the above-described range, the connection structure according to the present embodiment has excellent thermal aging resistance.

The retention rate of the Charpy impact strength at 23° C. after the thermoplastic resin composition used in the present embodiment has been left for 2,000 hours under a 85° C., 85% relative humidity environment is, based on the Charpy impact strength of the thermoplastic resin composition before being left, preferably 60% or more, more preferably 70% or more, and still more preferably 80% or more. Although the upper limit of the retention rate of this Charpy impact strength is not especially limited, it may be, for example, 100%. If this retention rate is within the above-described range, the connection structure according to the present embodiment has excellent humidity resistance.

The retention rate can be measured by the method described in the following Examples.

An example of the method for obtaining a thermoplastic resin composition having the above-described thermal aging resistance and humidity resistance is to obtain the thermoplastic resin composition based on the below-described production method (e.g., control of a screw configuration and the supply position of a flame retardant etc.) using specific amounts of (A) a polyphenylene ether-based resin, (B) a hydrogenated block copolymer, and (C) a flame retardant. It is especially preferred that component (B) is dispersed in the resin composition as a particle, and that its weight average particle size (hereinafter also referred to simply as "dispersed particle size") is 0.3 to 1 μm. The dispersed particle size of component (B) can be set to within the above-described range by means such as, for example, reducing the melt viscosity of component (A) (by adjusting the molecular weight, adding a plasticizer etc.), and preventing component (B) from degrading (by reducing the temperature during melt kneading, reducing the oxygen concentration etc.) and the like.

(Flame Retardancy)

Due to increases in the electrical capacity of solar power generation modules as a result of improvements in the performance of the battery cells, and a reduced thickness and greater compactness of solar power generation modules, it is desirable that the connection structure used in a solar power generation module has a high level of flame retardancy. The flame retardancy at a thickness of as small as 1.0 mm or less is especially important.

It is preferred that the UL-94 standard flame retardancy level of the thermoplastic resin composition used in the present embodiment is rank V-1 or higher at a thickness of 0.75 to 3.0 mm, and rank V-0 is more preferred.

If the flame retardancy level is within the above-described range, the connection structure according to the present embodiment has excellent flame retardancy.

In the present embodiment, the flame retardancy level can be measured based on the vertical flame test stipulated in UL-94 of the UL standards, with an increase in rank from, in order, rank not V, rank V-2, rank V-1, and rank V-0. These ranks are as described below in the Examples.

To make the UL-94 standard flame retardancy level of the thermoplastic resin composition having a thickness of 0.75 to 3.0 mm rank V-1 or higher, it is preferred that the thermoplastic resin composition contains a flame retardant. Considering also that the dispersed particle size of the elastomer component is controlled in order to achieve the above-described impact resistance at low temperature, it is preferred to blend a flame retardant that has an effect of plasticizing the thermoplastic resin. From the perspective of controlling the dispersion state (dispersed particle size) of the elastomer component in the composition, it is preferred to melt-knead the thermoplastic resin and the elastomer component in the presence of a flame retardant that has an effect of plasticizing the thermoplastic resin.

(Rigidity)

The connection structure used in a solar power generation module has, for example, a bypass diode and the like arranged in a junction box, so that there are cases in which the internal parts need to be fixed. Consequently, it is desirable that the connection structure used in a solar power generation module has, in addition to the above-described impact resistance at low temperature, excellent rigidity. Further, for a connector, in many cases the configuration is assembled by using a screwing or snapfitting method to link two connectors together or connect a connector and a cable. Therefore, rigidity is required to obtain a sufficient fastening strength.

The flexural modulus of the thermoplastic resin composition used in the present embodiment is preferably 1,800 MPa or more, more preferably 1,800 to 3,000 MPa, and even more preferably 2,000 to 2,500 MPa. If the flexural modulus is within this range, the connection structure according to the present embodiment tends to have excellent rigidity.

In the present embodiment, the flexural modulus is a value measured at 2 ram/min based on ISO-178.

(Chemical Resistance)

Solar power generation modules are often placed outside, and depending on the placement location, they can be exposed to excrement from livestock or wild animals. Consequently, it is desirable that the connection structure used in a solar power generation module not only has electrical properties and flame retardancy under a high-temperature, high-humidity environment, but also has resistance to ammonia. Further, for a junction box, an adhesive agent and the like may be used when fixing a diode, sealing the junction box, or fixing the solar power generation module and the junction box. In addition, the connection structure can also come into contact with oil or a silicone used in a rust inhibitor, a lubricant and the like. Consequently, the connection structure used in a solar power generation module needs to have resistance against various chemicals.

Since the connection structure according to the present embodiment contains the below-described thermoplastic resin composition, the connection structure tends to have excellent chemical resistance.

(Thermoplastic Resin Composition)

Since the connection structure according to the present embodiment is normally produced by injection molding, a thermoplastic resin composition is used as the forming material. The thermoplastic resin composition used in the present embodiment contains (A) a polyphenylene ether-based resin, (B) a hydrogenated block copolymer, and (C) a flame retardant. Further, in this thermoplastic resin composition, based on a total of 100 parts by mass of (A) and (B), the content of (A) is 70 to 85 parts by mass, the content of (B) is 15 to 30 parts by mass, and the content of (C) is 5 to 30 parts by mass. Further, the Charpy impact strength at −40° C. of the thermoplastic resin composition is more than 15 kJ/m².

In addition, from the perspective of the practical properties of the connection structure for the solar power generation module, it is preferred that the thermoplastic resin composition has high heat resistance and rigidity. As described above, the thermoplastic resin composition preferably has a flexural modulus of 1,800 MPa or more. From the perspective of heat resistance, it is preferred that the glass transition temperature is 100° C. or more. The thermoplastic resin composition contains an elastomer component, such as a hydrogenated block copolymer, and a flame retardant. Even for a thermoplastic resin composition that contains these components, it is preferred that rigidity and heat resistance are maintained. An example of a method to maintain rigidity is to control the amount of the elastomer component blended within the above-described specific range. An example of a method to maintain heat resistance is to control the blend ratio of the polyphenylene ether and the flame retardant within the above-described specific range.

Still further, it is preferred that the connection structure for the solar power generation module according to the present embodiment has excellent strength, electrical properties, long-term heat resistance and the like. From these perspectives, the thermoplastic resin composition contains (A) the polyphenylene ether-based resin. A thermoplastic resin composition that contains such a component tends to have good strength, electrical properties, and long-term heat resistance.

The thermoplastic resin composition used in the present embodiment preferably has a comparative tracking index (CTI) based on UL-746A (ASTM D3638) at a thickness of 3.0 mm of 2 or less, and more preferably 1 or less. By using a thermoplastic resin composition with a CTI within this range, a connection structure having excellent electrical properties can be obtained. An example of a method to obtain a thermoplastic resin composition with a CTI within this range is to control the blend ratio of each component forming the thermoplastic resin composition within the above-described specific range.

The thermoplastic resin composition used in the present embodiment may be a thermoplastic resin composition that contains components (A) to (C) in the above-described ranges, and does not dissolve after being dipped for 24 hours in a 23° C. aqueous solution of 25 mass % ammonia. By using such a thermoplastic resin composition, a connection structure can be obtained that has excellent resistance against chemicals such as ammonia. An example of a method to obtain a thermoplastic resin composition having such chemical resistance is to control the blend ratio of each component forming the thermoplastic resin composition within the above-described specific range.

Each of the components forming the thermoplastic resin composition that is used in the present embodiment will now be described in detail.

[(A) Polyphenylene Ether-Based Resin]

(A) the polyphenylene ether-based resin used in the present embodiment includes a homopolymer, or a copolymer, having a repeating unit represented by the following general formula (III) and/or general formula (IV).

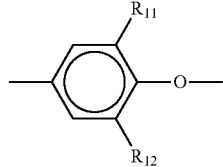

General Formula (III)

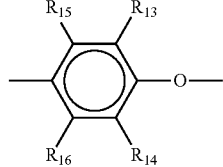

General Formula (IV)

In general formulae (III) and (IV), R11, R12, R13, R14, R15, and R16 each independently represent a hydrogen atom, an alkyl group having 1 to 4 carbon atoms, an aryl group having 6 to 9 carbon atoms, or a halogen atom. However, R15 and R16 are not simultaneously hydrogen.

Representative homopolymer examples of the polyphenylene ether include poly(2,6-dimethyl-1,4-phenylene)ether, poly(2-methyl-6-ethyl-1,4-phenylene)ether, poly(2,6-diethyl-1,4-phenylene)ether, poly(2-ethyl-6-n-propyl-1,4-phenylene)ether, poly(2,6-di-n-propyl-1,4-phenylene)ether, poly(2-methyl-6-n-butyl-1,4-phenylene)ether, poly(2-ethyl-6-isopropyl-1,4-phenylene)ether, poly(2-methyl-6-chloroethyl-1,4-phenylene)ether, poly(2-methyl-6-hydroxyethyl-1,4-phenylene)ether, and poly(2-methyl-6-chloroethyl-1,4-phenylene)ether.

The polyphenylene ether copolymer is a copolymer that has as a main repeating unit a repeating unit represented by general formula (III) and/or general formula (IV). Examples thereof include a copolymer of 2,6-dimethylphenol and 2,3,6-trimethylphenol, a copolymer of 2,6-dimethylphenol and o-cresol, and a copolymer of 2,6-dimethylphenol, 2,3,6-trimethylphenol and o-cresol. Among polyphenylene ethers, poly(2,6-dimethyl-1,4-phenylene)ether is preferred. Especially preferred are the polyphenylene ethers described in Japanese Patent Laid-Open No. 63-301222 and the like, which include a 2-(dialkylaminomethyl)-6-methylphenylene ether unit, a 2-(N-alkyl-N-phenylaminomethyl)-6-methylphenylene ether unit and the like as a partial structure.

The reduction viscosity (units dl/g, chloroform solution, measured at 30° C.) of the polyphenylene ether is preferably in the range of 0.25 to 0.6, and more preferably in the range of 0.35 to 0.55.

In the present embodiment, a modified polyphenylene ether in which a part or all of the polyphenylene ether has been modified with an unsaturated carboxylic acid or a derivative thereof can be used. Such a modified polyphenylene ether is described in Japanese Patent Laid-Open No. 2-276823 (U.S. Pat. Nos. 5,159,027 and 35,695), Japanese Patent Laid-Open No. 63-108059 (U.S. Pat. Nos. 5,214,109 and 5,216,089), and Japanese Patent Laid-Open No. 59-59724 and the like. The modified polyphenylene ether is produced by melt-kneading and reacting the unsaturated carboxylic acid or a derivative thereof with the polyphenylene ether in the presence or absence of a radical initiator, for example. Alternatively, the modified polyphenylene ether is produced by dissolving the polyphenylene ether and the unsaturated carboxylic acid or a derivative thereof in an organic solvent in the presence or absence of a radical initiator, and reacting in a solution.

Examples of the unsaturated carboxylic acid or a derivative thereof include maleic acid, fumaric acid, itaconic acid, halogenated maleic acid, cis-4-cyclohexene 1,2-dicarboxylic acid, and endo-cis-bicyclo(2,2,1)-5-heptene-2,3-dicarboxylic acid, an acid anhydride, ester, amide, and imide of these dicarboxylic acids, acrylic acid and methacrylic acid, or an ester and an amide of these monocarboxylic acids. Further, a compound that can turn into a derivative used in the present embodiment, which although is a saturated carboxylic acid, thermally decomposes at the reaction temperature at which the modified polyphenylene ether is produced, may also be used. Specific examples include malic acid and citric acid. These compounds can be used singly or in combinations of two or more thereof.

Normally, the junction box is often placed outside, such as on the rear side of a solar panel. It is desirable that the physical properties of the junction box do not deteriorate even under a high-temperature, high-humidity environment. From this perspective, as the thermoplastic resin composition used in the present embodiment, more preferred is a resin composition that contains a modified polyphenylene ether that has excellent hydrolysis resistance and exhibits little deterioration in impact strength under a high-temperature, high-humidity environment.

The polyphenylene ether can generally be obtained as a powder. The powder preferably has an average particle size of 1 to 1,000 µm, more preferably 10 to 700 µm, and especially preferably 100 to 500 µm. From the perspective of handleability during processing, the average particle size is preferably 1 µm or more. To suppress the occurrence of unmelted melt-kneaded product, the average particle size is preferably 1,000 µm or less. The average particle size is measured by a laser particle size analyzer if the particle size is 100 µm or less, and with a vibrating sieve if the particle size is equal to or greater than that.

(A) the polyphenylene ether-based resin may contain a styrene-based resin. Here, styrene-based resin refers to a styrene-based compound or a polymer obtained by polymerizing a styrene-based compound and a compound that is copolymerizable with a styrene-based compound in the presence or absence of a rubber polymer. Specific examples of the styrene-based compound include styrene, α-methylstyrene, 2,4-dimethylstyrene, monochlorostyrene, p-methylstyrene, p-tert-butyl styrene, and ethyl styrene. Especially preferred is styrene. Further, examples of a compound that is copolymerizable with a styrene-based compound include methacrylates such as methyl methacrylate and ethyl methacrylate; unsaturated nitrile compounds such as acrylonitrile and methacrylonitrile; and acid anhydrides such as maleic anhydride. These compounds are used along with the styrene-based compound. The amount of copolymerizable compound to be used is, based on the total amount with the styrene-based compound, preferably 20 mass % or less, and more preferably 15 mass % or less.

Further, examples of the rubber polymer include a conjugated diene-based rubber, a copolymer of a conjugated diene and an aromatic vinyl compound, or an ethylene-propylene copolymer rubber. Specifically, polybutadiene and a styrene-butadiene copolymer are preferred. Further, it is especially preferred to use as the rubber copolymer a partially hydrogenated polybutadiene that has a degree of unsaturation of about 80 to 20%, or a polybutadiene containing 90% or more of 1,4-cis bonds. Specific examples of such a styrene-based resin include polystyrene and rubber-reinforced polystyrene, a styrene-acrylonitrile copolymer (AS resin), an acrylonitrile-butadiene-styrene copolymer (ABS resin), and other styrene-based copolymers. Especially preferred is the combination of polystyrene and a rubber-reinforced polystyrene that uses a partially hydrogenated polybutadiene that has a degree of unsaturation of 80 to 20%.

In the thermoplastic resin composition used in the present embodiment, a preferred styrene-based resin is a homopolystyrene, and either an atactic polystyrene or a syndiotactic polystyrene can be used. It is preferred not to add a rubber-modified styrene, as the thermal aging resistance of the thermoplastic resin composition deteriorates.

The content of the styrene-based resin is, based on 100 parts by mass of (A) the polyphenylene ether-based resin, in the range of 0 to 20 parts by mass, and preferably in the range of 0 to 10 parts by mass.

Here, the styrene-based resin is used in a form substituting for a part of the polyphenylene ether, which means that the polyphenylene ether is decreased by the amount of styrene-based resin that is contained.

If the styrene-based resin content increases, the fluidity of the thermoplastic resin composition increases. If the styrene-based resin content is 20 parts by mass or less, the thermoplastic resin composition has excellent heat resistance and flame retardancy. If no styrene-based resin is added, the thermoplastic resin composition has excellent heat resistance and thermal aging resistance in particular.

When producing the thermoplastic resin composition used in the present embodiment using a twin-screw extruder, although the styrene-based resin can be simultaneously supplied from the same upstream side supply port as for the polyphenylene ether, it is preferred to supply from a barrel (a rear stage barrel) that is at least 40% down from the upstream side of the extruder barrel. By supplying the styrene-based resin from a rear stage barrel, the obtained thermoplastic resin composition has excellent thermal aging resistance. This will be described in more detail in the below-described production method.

In the thermoplastic resin composition used in the present embodiment, the content of (A) the polyphenylene ether-based resin is, based on a total of 100 parts by mass of (A) the polyphenylene ether-based resin and (B) the hydrogenated block copolymer, in the range of 70 to 85 parts by mass, and preferably is 75 to 85 parts by mass. If the content of (A) the polyphenylene ether-based resin is equal to or more than this lower limit, the flame retardancy and the heat-resistant temperature of the thermoplastic resin composition improve, and the thermoplastic resin composition has excellent thermal aging resistance properties. Further, if the content of (A) the polyphenylene ether-based resin is equal to or less than this upper limit, since this naturally means that a suitable amount of hydrogenated block copolymer is contained, the impact resistance of the thermoplastic resin composition is maintained.

[(B) Hydrogenated Block Copolymer]

(B) the hydrogenated block copolymer used in the present embodiment is a hydrogenated block copolymer obtained by hydrogenating a block copolymer of styrene and a conjugated diene compound, namely, a block copolymer formed from a polystyrene block and a conjugated diene compound polymer block.

The hydrogenation ratio of the unsaturated bonds derived from the conjugated diene compound by hydrogenation is preferably 60% or more, more preferably 80% or more, and even more preferably 95% or more. If S represents the styrene block chain and B represents the diene compound block chain, the structure of the block copolymer before hydrogenation is S—B—S, S—B—S—B, (S—B—)$_4$—Si, S—B—S—B—S and the like. Further, the microstructure of the diene compound polymer block can be freely selected. Normally, the vinyl bond content (total of the 1,2-vinyl bonds and the 3,4-vinyl bonds) is in the range of 2 to 60% based on all the bonds of the diene compound polymer, and preferably is in the range of 8 to 40%.

The number average molecular weight of (B) the hydrogenated block copolymer is preferably 150,000 to 500,000, more preferably 150,000 to 350,000, and even more preferably 200,000 to 300,000.

If the number average molecular weight of (B) the hydrogenated block copolymer is high, the impact resistance of the thermoplastic resin composition improves. If the number average molecular weight of (B) the hydrogenated block copolymer is 200,000 or more, the impact resistance of the thermoplastic resin composition is even better. If the number average molecular weight of (B) the hydrogenated block copolymer is 500,000 or less, the impact resistance of the thermoplastic resin composition is sufficient, the load when melt extruding the thermoplastic resin composition is reduced, the processing fluidity is excellent, and the dispersibility of (B) the hydrogenated block copolymer into the thermoplastic resin composition is also excellent. An example of a method to control the number average molecular weight of (B) the hydrogenated block copolymer to within the above-described range is to control the amount of catalyst, the reaction time, and the temperature.

In (B) the hydrogenated block copolymer used in the present embodiment, it is preferred that at least one of the styrene polymer block chains has a number average molecular weight of 15,000 or more. More preferred is 20,000 or more, and even more preferred is 30,000 or more and 80,000 or less. It is especially preferred that the number average molecular weight of all of the styrene polymer block chains is 15,000 or more.

In the present embodiment, the number average molecular weight is a value calculated based on molecular weight in terms of polystyrene measured by gel permeation chromatography (GPC).

Although the share of the styrene polymer block of (B) the hydrogenated block copolymer based on the whole copolymer is not especially limited as long as the number average molecular weight of the styrene polymer block chain is in the above-described range, this share is generally in the range of 10 to 70 mass %, and preferably in the range of 20 to 50 mass %.

(B) the hydrogenated block copolymer can also be a combination of two types or more having different compositions or structures. Examples of combinations that may be used include a combination of a hydrogenated block copolymer having a bound styrene polymer block content of 50% or more and a hydrogenated block copolymer having a bound styrene polymer block content of 30% or less, a combination of hydrogenated block copolymers having different molecular weights, or a combination of hydrogenated random block copolymers obtained by hydrogenating block copolymers that contain a random copolymer block of styrene and a conjugated diene.

In the thermoplastic resin composition used in the present embodiment, the content of (B) the hydrogenated block copolymer is, based on a total of 100 parts by mass of (A) the polyphenylene ether-based resin and (B) the hydrogenated block copolymer, in the range of 15 to 30 parts by mass, and preferably is 15 to 25 parts by mass. If the content of (B) the hydrogenated block copolymer is 15 parts by mass or more, the impact strength of the thermoplastic resin composition is excellent. If the content of (B) the hydrogenated block copolymer is 30 parts by mass or less, the impact resistance of the thermoplastic resin composition is high, and rigidity, such as the flexural modulus and flexural strength, is excellent. If the content exceeds 30 parts by mass, the compatibility between the polyphenylene ether-based resin and the hydrogenated block copolymer deteriorates, which can result in a delamination in the finally-obtained molding.

It is preferred that (B) the hydrogenated block copolymer is dispersed in the thermoplastic resin composition as a particle and has the weight average particle size of 0.3 to 1 µm, and more preferably the weight average particle size is 0.4 to 0.7 µm. If the weight average particle size is within this range, the impact resistance and the thermal aging resistance of the thermoplastic resin composition tend to be excellent.

In the present embodiment, the weight average particle size is a value measured based on a method described in the following Examples.

The weight average particle size of (B) the hydrogenated block copolymer can be adjusted based on the molecular weight of (B) the hydrogenated block copolymer or the content of the styrene block, the melt viscosity of (A) the polyphenylene ether-based resin, kneading temperature or oxygen concentration during melt kneading, or the mixing method of the respective components. Normally, although the weight average particle size of (B) the hydrogenated block copolymer dispersed in (A) the polyphenylene ether-based resin is often smaller than 0.3 µm, the weight average particle size of (B) the hydrogenated block copolymer can be set from 0.3 to 1 µm by performing several of the means (1) to (7) illustrated below.

(1) Using a hydrogenated block copolymer having a number average molecular weight of 150,000 or more.
(2) Reducing the melt viscosity of (A) the polyphenylene ether-based resin by using (A) a polyphenylene ether-based resin with a low viscosity, adding a plasticizer for (A) the polyphenylene ether-based resin or the like.
(3) Using as the below-described (C) flame retardant a phosphate compound having an effect of plasticizing (A) the polyphenylene ether-based resin.
(4) Employing the screw configuration described in the production method.
(5) Adding the phosphate compound at a position upstream from the kneading zone of the extruder.
(6) Reducing the kneading temperature when melt-kneading (B) the hydrogenated block copolymer. For example, setting the barrel temperature up to at least 30% from the upstream side of the extruder in the range of 50 to 250° C., and the barrel temperature that is at least 30% down from the upstream side in the range of 250 to 320° C., and preferably in the range of 260 to 300° C.
(7) Reducing the oxygen concentration during melt kneading. For example, setting the oxygen concentration at a first raw material supply port provided upstream of the extruder to 15 volume % or less.

It is preferred that (B) the hydrogenated block copolymer used in the present embodiment has a number average molecular weight of 150,000 to 500,000, and is dispersed in the thermoplastic resin composition as a particle, and has a weight average particle size of 0.3 to 1 μm. A thermoplastic resin composition that contains a hydrogenated block copolymer having such properties tends to have excellent impact resistance and thermal aging resistance of the thermoplastic resin composition.

[(C) Flame Retardant]

(C) the flame retardant used in the present embodiment is preferably at least one selected from the group consisting of inorganic flame retardants, silicone compounds, and organic phosphorous compounds.

Examples of the inorganic flame retardant include water of crystallization-containing alkali metal hydroxides or alkaline earth metal hydroxides, such as magnesium hydroxide and aluminum hydroxide, zinc borate compounds, and zinc stannate compounds, that are generally used as a synthetic resin flame retardant.

Examples of the silicone compound include an organopolysiloxane or a modified product including an organopolysiloxane. The silicone compound may be a liquid or a solid at ordinary temperature. The skeleton structure of the organopolysiloxane may be either linear or branched. However, preferred is a branched structure, and further a three-dimensional structure, having a trifunctional or a tetrafunctional structure in the molecule. The bonding group with the main chain or the branched side chain is a hydrogen or a hydrocarbon group, and is preferably a phenyl group, a methyl group, an ethyl group, and a propyl group. However, some other hydrocarbon group may also be used. As the terminal bonding group, any of —OH, an alkoxy group, or a hydrocarbon group may be used.

It is preferred that a silicone compound generally used as a flame retardant is a polymer obtained by polymerizing any of four types of siloxane units (M unit: $R_3SiO_{0.5}$, D unit: $R_2SiO_{1.0}$, T unit: $RSiO_{1.5}$, and Q unit: $SiO_{2.0}$). A preferred organopolysiloxane used in the present embodiment has 60 mole % or more, more preferably 90 mole % or more, and especially preferably 100 mole % or more, of a siloxane unit (T unit) represented by the formula $RSiO_{1.5}$ based on the total content of the four types of siloxane units, and that in the whole silicone compound to be used, at least 60 mole %, and more preferably 80 mole % or more, of the bound hydrocarbon groups in all of the siloxane units represented by the above-described R have a phenyl group. As these organopolysiloxanes, a modified silicone in which the bonding group is substituted with an amino group, an epoxy group, a mercapto group, or another modifying group is also used. Further, a modified product in which the organopolysiloxane is chemically or physically adsorbed to an inorganic filler, such as silica or calcium carbonate, can also be used.

Examples of the organic phosphorous compound include phosphate compounds and phosphazene compounds. Phosphate is added to improve flame retardancy. Any organic phosphate that is commonly used as a flame retardant can be used.

Specific examples of the phosphate compound include, but are not limited to, triphenyl phosphate, trisnonylphenyl phosphate, resorcinol bis(diphenylphosphate), resorcinol bis[di(2,6-dimethylphenyl)phosphate], 2,2-bis{4-[bis(phenoxy)phosphoryloxy]phenyl}propane, and 2,2-bis{4-[bis(methylphenoxy)phosphoryloxy]phenyl}propane. Other than these, examples of phosphorus flame retardants include phosphate-based flame retardants, such as trimethyl phosphate, triethyl phosphate, tributyl phosphate, trioctyl phosphate, tributoxyethyl phosphate, tricresyl phosphate, cresyl phenyl phosphate, octyl diphenyl phosphate, and diisopropyl phenyl phosphate, and monophosphate compounds and aromatic condensed phosphate compounds such as diphenyl-4-hydroxy-2,3,5,6-tetrabromobenzyl phosphonate, dimethyl-4-hydroxy-3,5-dibromobenzyl phosphonate, diphenyl-4-hydroxy-3,5-dibromobenzyl phosphonate, tris(chloroethyl) phosphate, tris(dichloropropyl)phosphate, tris(chloropropyl) phosphate, bis(2,3-dibromopropyl)-2,3-dichloropropyl phosphate, tris(2,3-dibromopropyl)phosphate, bis(chloropropyl)monooctyl phosphate hydroquinonyl diphenyl phosphate, phenylnonyl phenyl hydroquinonyl phosphate, and phenyl dinonylphenyl phosphate.

Among these, it is preferred to use an aromatic condensed phosphate compound, because little gas is produced during processing and thermal stability is excellent.

These aromatic condensed phosphate compounds are generally commercially available. Known examples include CR741, CR733S, PX200, and PX202 from Daihachi Chemical Industry Co., Ltd., and FP600, FP700, and FP800 from ADEKA Corporation.

As the flame retardant used in the present embodiment, a phosphate-based compound (condensed phosphate) represented by the following general formula (I) or (II) is preferred. Especially preferred is a phosphate-based compound (condensed phosphate) represented by the following general formula (I).

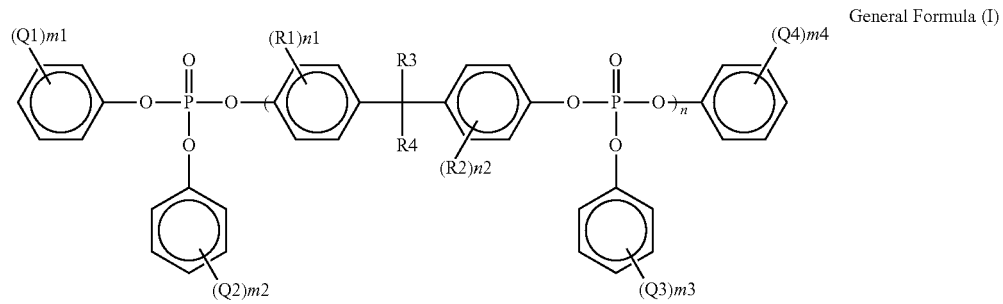

General Formula (I)

General Formula (II)

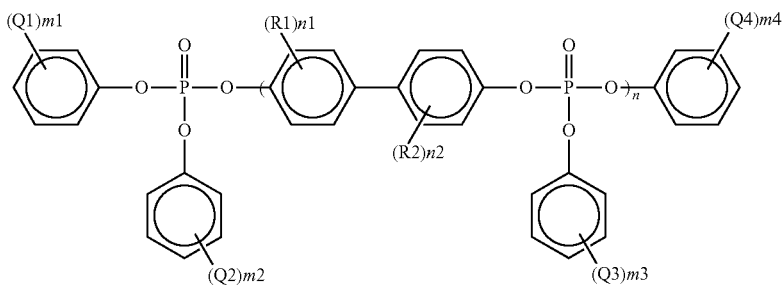

In general formulae (I) and (II), Q1, Q2, Q3, and Q4 are a substituent respectively and each independently represent an alkyl group having 1 to 6 carbon atoms, R1 and R2 each represent a methyl group, R3 and R4 each independently represent a hydrogen atom or a methyl group, n is an integer of 1 or more, n1 and n2 each independently denote an integer from 0 to 2, and m1, m2, m3, and m4 each independently denote an integer from 0 to 3.

In each molecule of the condensed phosphate represented by general formulae (I) and (II), n is an integer of 1 or more, and preferably an integer of 1 to 3.

Among the condensed phosphates represented by general formulae (I) and (II), preferred condensed phosphates are a condensed phosphate in which m1, m2, m3, m4, n1, and n2 in formula (I) are zero, and R3 and R4 are a methyl group, or a condensed phosphate in which Q1, Q2, Q3, Q4, R3, and R4 in formula (I) are a methyl group, n1 and n2 are zero, and m1, m2, m3, and m4 are an integer of 1 to 3. More preferred is to contain 50 mass % or more of a phosphate in which n is an integer in the range of 1 to 3, and especially is 1. Further, if the phosphate compounds represented by general formulae (I) and (II) are a mixture of compounds in which n is different, the average value of n for the whole mixture is 1 or more.

Especially preferred as these aromatic condensed phosphate compounds is an aromatic condensed phosphate compound having an acid value (value obtained based on JIS K2501) of 0.1 or less.

Further, as the phosphazene compound, a phenoxy phosphazene or crosslinked product thereof is preferred. Especially preferred is a phenoxy phosphazene compound having an acid value (value obtained based on JIS K2501) of 0.1 or less.

Although the content of (C) the flame retardant depends on the required level of flame retardancy, this content is, based on a total of 100 parts by mass of (A) the polyphenylene ether-based resin and (B) the hydrogenated block copolymer, in the range of 5 to 30 parts by mass, and preferably in the range of 15 to 25 parts by mass. If the content of (C) the flame retardant is 5 parts by mass or more, the flame retardancy of the thermoplastic resin composition is excellent. If the content of (C) the flame retardant is 30 parts by mass or less, the flame retardancy of the thermoplastic resin composition is sufficient, while if the content exceeds 30 parts by mass, the heat resistance of the thermoplastic resin composition can deteriorate.

[Polyolefin]

In the thermoplastic resin composition used in the present embodiment, a part of the hydrogenated block copolymer can be substituted with a polyolefin. In this case, the content of component (B) in the thermoplastic resin composition is considered as the total content of the hydrogenated block copolymer and the polyolefin. By substituting a part of the hydrogenated block copolymer with a polyolefin, the mold release properties of the thermoplastic resin composition during molding are improved.

Examples of the polyolefin used in the present embodiment include low-density polyethylene, high-density polyethylene, linear low-density polyethylene, polypropylene, an ethylene-propylene copolymer, an ethylene-butene copolymer, an ethylene-octene copolymer, and an ethylene-acrylate copolymer. Among these, preferred are low-density polyethylene and an ethylene-propylene copolymer. Ethylene-propylene copolymers, ethylene-butene copolymers, ethylene-octene copolymers, or ethylene-acrylate copolymers are generally copolymers that are amorphous or have a low degree of crystallinity. These copolymers may be copolymerized with another monomer, as long as there are no additional effects on performance. Although the component ratio between ethylene and propylene, butene, or octene is not especially limited, generally the propylene, butene, or octene component is in the range of 5 to 50 mole %. Two or more of these polyolefins may be used in combination.

The MFR of the polyolefin is a value measured at a cylinder temperature of 230° C. based on ASTM D-1238 of preferably 0.1 to 50 g/10 minutes, and more preferably 0.2 to 20 g/10 minutes.

The amount of the polyolefin to be added is, based on a total of 100 parts by mass of the polyphenylene ether-based resin and the hydrogenated block copolymer, preferably 0.05 to 10 parts by mass, more preferably in the range of 0.1 to 6 parts by mass, and even more preferably in the range of 0.5 to 2 parts by mass. If the amount of the polyolefin to be added is 0.05 parts by mass or more, a mold release effect is exhibited. If the amount of the polyolefin to be added is 10 parts by mass or less, a problem of peel-off does not occur and the mechanical properties are excellent.

[Thermal Stabilizer]

It is preferred to add a thermal stabilizer to the thermoplastic resin composition used in the present embodiment. The addition of a thermal stabilizer suppresses thermal degradation of the thermoplastic resin composition, so that not only impact resistance, but thermal aging resistance is improved as well.

The thermal stabilizer is a component for stabilizing peroxide radicals, such as hydroperoxy radicals, generated by heat or light exposure during production, molding, and use of the thermoplastic resin composition, and decomposing produced peroxides, such as a hydroperoxide. Examples of the thermal stabilizer include hindered phenol-based antioxidants and phosphite-based peroxide decomposition agents. The former prevents autooxidation by acting as a radical chain inhibitor, and the latter prevents autooxidation by decomposing the peroxide produced in the system into a more stable alcohol.

Specific examples of the hindered phenol-based thermal stabilizer (antioxidant) as the thermal stabilizer include 2,6-di-t-butyl-4-methylphenol, pentaerythritol tetrakis[3-(3,5-di-t-butyl-4-hydroxyphenyl)propionate], n-octadecyl-3-(3,5-di-t-butyl-4-hydroxyphenyl)propionate, 2,2'-methylenebis (4-methyl-6-t-butylphenol), 2,6-di-t-butyl-4-(4,6-bis (octylthio)-1,3,5-triazin-2-ylamino)phenol, 2-t-butyl-6-(3-t-butyl-2-hydroxy-5-methylbenzyl)-4-methylphenyl acrylate, 2-[1-(2-hydroxy-3,5-di-t-pentylphenyl)ethyl]-4,6-di-t-pentylphenyl acrylate, 4,4'-butylidenebis(3-methyl-6-t-butylphenol), 4,4'-thiobis(3-methyl-6-t-butylphenol), alkylated bisphenol, tetrakis[methylene-3-(3,5-di-t-butyl-4-hydroxyphenyl)propionate]methane, and 3,9-bis{2-[3-(3-t-butyl-4-hydroxy-5-methylphenyl)-propionyloxy]-1,1-dimethylethyl}-2,4,8,10-tetraoxyspiro[5.5]undecane.

Specific examples of the peroxide decomposition agent as the thermal stabilizer include phosphite-based thermal stabilizers (peroxide decomposition agents) such as trisnonylphenyl phosphite, triphenyl phosphite, tris(2,4-di-t-butylphenyl) phosphite, bis(2,4-di-t-butylphenyl)pentaerythritol-di-phosphite, and bis(2,6-di-t-butyl-4-methylphenyl) pentaerythritol-di-phosphite, or organosulfur-based thermal stabilizers (peroxide decomposition agents) such as dilauryl-3,3'-thiodipropionate, dimyristyl-3,3'-thiodipropionate, distearyl-3,3'-thiodipropionate, pentaerythrityltetrakis(3-laurylthiopropionate), ditridecyl-3,3'-thiodipropionate, and 2-mercaptobenzimidazole.

In the present embodiment, it is effective to use the hindered phenol-based thermal stabilizer as the antioxidant and phosphite-based or organosulfur-based thermal stabilizer as the peroxide decomposition agent together.

Further, as another thermal stabilizer, a metal oxide or sulfide, such as zinc oxide, magnesium oxide, and zinc sulfide, can be also be combined with the above-described thermal stabilizer.

The total amount of thermal stabilizer to be added that is used is, based on a total of 100 parts by mass of (A) the polyphenylene ether-based resin and (B) the hydrogenated block copolymer, preferably 0.1 to 3 parts by mass, more preferably in the range of 0.2 to 2 parts by mass, and even more preferably in the range of 0.3 to 2 parts by mass. If the total amount of thermal stabilizer to be added is 0.1 parts by mass or more, a heat stabilizing effect is exhibited. This heat stabilizing effect reaches its limits at 3 parts by mass. Consequently, it is economically preferable that the total amount of thermal stabilizer to be added is 3 parts by mass or less.

[UV Absorber, Light Stabilizer]

It is preferred to add a UV absorber and/or a light stabilizer to the thermoplastic resin composition used in the present embodiment. By adding these additives, not only is the light resistance of the thermoplastic resin composition improved, but the thermal aging resistance of the thermoplastic resin composition is also improved.

As the UV absorber used in the present embodiment, a UV absorber that is generally commercially available can be used. Preferred are benzotriazole-based UV absorbers. Specific examples include 2-(2'-hydroxy-5'-methylphenyl)benzotriazole, 2-(3-t-butyl-5-methyl-2-hydroxyphenyl)-5-chlorobenzotriazole, 2-(2'-hydroxy-3',5'-di-t-butylphenyl) benzotriazole, 2-(2'-hydroxy-5'-t-octylphenyl)benzotriazole, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2-(2'-hydroxy-3',5'-di-t-aminophenyl)benzotriazole, 2-{2'-hydroxy-3'-(3",4",5",6"-tetrahydrophthalimidemethyl)-5'-methylphenyl}benzotriazole, 2,2-methylenebis{4-(1,1,3,3-tetramethylbutyl)-6-(2H-benzotriazol-2-yl)phenol}, and 6-(2-benzotriazolyl)-4-t-octyl-6'-t-butyl-4'-methyl-2,2'-methylenebisphenol.

As the light stabilizer used in the present embodiment, a light stabilizer that is generally commercially available can be used. Preferred is a hindered amine-based light stabilizer. Specific examples include bis(2,2,6,6-tetramethyl-4-piperidyl)sebacate, bis(1-octyloxy-2,2,6,6-tetramethyl-4-piperidyl)sebacate, polycondensation product of dimethyl succinate and 1-(2-hydroxyethyl)-4-hydroxy-2,2,6,6-tetramethylpiperidine, poly[{6-(1,1,3,3-tetramethylbutyl) amino-1,3,5-triazine-2,4-diyl}{(2,2,6,6-tetramethyl-4-piperidyl)imino}hexamethylene{(2,2,6,6-tetramethyl-4-piperidyl)imino}], condensation product of N,N'-bis(3-bis(3-aminopropyl)ethylenediamine and 2,4-bis[N-butyl-N-(1,2,2,6,6-pentamethyl-4-piperidyl)amino]-6-chloro-1,3,5-triazine, 1,2,3,4-tetra(2,2,6,6-tetramethyl-4-piperidyl)-butanetetracarboxylate, 1,4-bis(2,2,6,6-tetramethyl-4-piperidyl)-2,3-butanedione, tris-(2,2,6,6-tetramethyl-4-piperidyl)trimellitate, 1,2,2,6,6-pentamethyl-4-piperidyl-n-octoate, 1,2,2,6,6-pentamethyl-4-piperidylstearate, 4-hydroxy-1,2,2,6,6-pentamethylpiperidine, bis(1,2,2,6,6-pentamethyl-4-piperidinyl)sebacate, and bis(1,2,2,6,6-pentamethyl-4-piperidyl) 2-(3,5-t-butyl-4-hydroxybenzyl)-2-n-butylmalonate.

These UV absorbers and light stabilizers can be used singly or in combinations of two or more thereof.

In the present embodiment, by using the UV absorber and the light stabilizer together, the resistance to light discoloration of the thermoplastic resin composition is substantially improved, and the thermal aging resistance of the thermoplastic resin composition is improved as well.

The mass ratio (light stabilizer/UV absorber) between the light stabilizer and the UV absorber is preferably in the range of 1/99 to 99/1, more preferably in the range of 95/5 to 5/95, and even more preferably in the range of 50/50 to 90/10. Further, the total amount of the UV absorber and the light stabilizer to be added is, based on a total of 100 parts by mass of (A) the polyphenylene ether-based resin and (B) the hydrogenated block copolymer, preferably in the range of 0.05 to 5 parts by mass, and more preferably in the range of 0.1 to 3 parts by mass. If the total amount of the UV absorber and the light stabilizer to be added is 0.05 parts by mass or more, a light resistance effect is exhibited. This light resistance effect reaches its limits at 5 parts by mass. Consequently, it is economically preferable that the total amount of the UV absorber and the light stabilizer to be added is 5 parts by mass or less.

[Other Additives]

An epoxy compound can be added for combined use to the thermoplastic resin composition used in the present embodiment. By using an epoxy compound, the resistance to light discoloration of the thermoplastic resin composition is substantially improved, and the thermal aging resistance of the thermoplastic resin composition is improved as well. Although any compound having an epoxy group can be used as the epoxy compound, it is preferred to use an aliphatic epoxy compound commonly used as a thermoplastic synthetic resin plasticizer, such as an epoxidized oil or fat having 3% or more of oxirane oxygen or an epoxidized fatty acid ester. More preferred is an epoxidized oil or fat. An especially preferred epoxy compound is epoxidized soybean oil having 6% or more of oxirane oxygen. The amount of the epoxy compound to be added is, based on 100 parts by mass of the thermoplastic resin composition, preferably in the range of 0.01 to 3 parts by mass, and more preferably in the range of 0.1 to 2 parts by mass.

To confer other properties to the thermoplastic resin composition used in the present embodiment, other commonly used plastic additives can also be added, such as a dripping inhibitor during combustion, such as polytetrafluoroethylene, a plasticizer, an antistatic agent, a lubricant, a mold release agent, a dye or pigment, or various inorganic fillers for plastic, within a range that does not inhibit the effects of the present invention, or other resins may be added.

In addition, other polymers or oligomers can be added to the thermoplastic resin composition used in the present embodiment. Examples may include, as a fluidity improver, a petroleum resin, terpene resin and hydrogenated resins thereof, coumarone resin, and coumarone indene resin, and to improve flame retardancy, a silicone resin and a phenol resin.

[Thermoplastic Resin Composition Production Method]

It is preferred that the thermoplastic resin composition used in the connection structure for the solar power generation module according to the present embodiment is obtained by melt-kneading the raw material components with an extruder. The melt-kneading conditions can be appropriately adjusted based on the type of resins that are used. A preferred production method for obtaining the thermoplastic resin composition used in the present embodiment will now be described in detail below.

As the used extruder, a twin-screw extruder that rotates in different directions or in the same direction is preferred.

A preferred production method for obtaining the thermoplastic resin composition used in the connection structure for the solar power generation module according to the present embodiment will now be described in detail below.

(1) Screw Configuration

When obtaining the thermoplastic resin composition by melt-kneading the raw material components using an extruder such as a twin-screw extruder, it is preferred that the configuration of the extruder is configured from, in order from the upstream side, a non-melt kneading zone (conveyance zone) where the thermoplastic resin is not melted, and a melt kneading zone (kneading zone).

It is preferred that that the non-melt kneading zone is, based on a total barrel length of the extruder of 100%, at least about 45%, more preferably 45 to 75%, and even more preferably 50 to 75%.

It is preferred that the screw configuration of the non-melt kneading zone is configured from a forward (positive spin) screw element and a forward (phase 45° or less) kneading disc element (denoted by R).

It is preferred that the screw configuration of the melt kneading zone after the non-melt kneading zone is a screw configuration that contains at least one element selected from the group consisting of an orthogonal (phase 90°) kneading disc element (denoted by N), a reverse (negative phase 45° or less) kneading disc element (denoted by L), and a reverse (reverse spin) screw element (denoted by Ls). Further, it is more preferred that this screw configuration contains a forward (phase 45° or less) kneading disc element. In addition, it is especially preferred that the melt kneading zone screw configuration combines at least two elements, including a forward (phase 45° or less) kneading disc element.

By having such a screw configuration, a thermoplastic resin composition can be obtained that has especially excellent thermal aging resistance.

In the non-melt kneading zone and the melt kneading zone, the respective elements can be used singly or in combinations of two or more.

Further, after the melt kneading zone, it is preferred to provide a vacuum degassing zone to remove volatile components and degradation products from the melted resin. It is preferred that the screw configuration in the vacuum degassing zone is not susceptible to shear by using a feed screw element such as a double-threaded positive-spin screw element.

(2) Kneading Conditions

From the perspective of the kneadability of the respective raw material components and the thermal aging resistance of the obtained thermoplastic resin composition, it is preferred that the screw rotating speed of the extruder is set at 150 to 600 rpm, more preferably at 200 to 500 rpm, and even more preferably at 300 to 450 rpm.

It is preferred that the barrel temperature of the extruder is set at 50 to 250° C. up to at least 30% from the upstream side, and in the range of 250 to 320° C., and preferably in the range of 260 to 300° C., from at least 30%, preferably 50%, and more preferably 75% down from the upstream side. When the barrel temperature setting is set at such a temperature, thermal degradation of the respective raw material components, especially an elastomer component such as the hydrogenated block copolymer, can be suppressed, and kneading can be sufficiently carried out. Consequently, the obtained thermoplastic resin composition has excellent thermal aging resistance and impact resistance at low temperature.

It is preferred that the oxygen concentration at the first raw material supply port provided in the upstream of the extruder is 10 volume % or less, and more preferably 5 volume % or less. Further, it is preferred that the supply apparatus of the respective raw material components is capable of supplying under an inert gas atmosphere having a low oxygen concentration. This is also the case when supplying auxiliary raw materials midway along the extruder barrel. When the oxygen concentration is maintained at 10 volume % or less, thermal degradation of the respective raw material components, especially an elastomer component such as the hydrogenated block copolymer, can be suppressed, and the thermal aging resistance of the obtained thermoplastic resin composition is excellent. When the oxygen concentration is maintained at 5 volume % or less, the obtained thermoplastic resin composition has especially excellent thermal aging resistance.

It is preferred that the temperature of the thermoplastic resin composition extruded from the die outlet of the extruder (hereinafter also referred to as "resin temperature") is 360° C. or less. By setting the resin temperature to 360° C. or less, deterioration in the impact resistance and the thermal aging resistance of the thermoplastic resin composition can be suppressed. The resin temperature is preferably set at 300 to 350° C. and more preferably at 310 to 340° C. Although the thermal aging resistance of the thermoplastic resin composition would be estimated to be even better if the resin temperature was set at less than 300° C., such a temperature is difficult to achieve in practice.

To set the resin temperature to 360° C. or less, the lengths of the non-melt kneading zone and the melt zone, the screw configuration, the barrel temperature setting, and the screw rotating speed are adjusted based on the quantitative ratio and type of thermoplastic resin composition.

(3) Method for Supplying the Respective Raw Material Components

It is preferred to supply the thermoplastic resin and the elastomer component, such as the hydrogenated block copolymer, from an upstream first supply port, although a part may be supplied into the extruder from a supply port midway along. It is preferred to supply the flame retardant into the extruder from the topmost first supply port and/or a second or third supply port midway along the extruder. It is more preferred that the flame retardant is supplied from the above-described non-melt kneading zone. When (A) the polyphenylene ether-based resin, (B) the hydrogenated block copolymer, and (C) the flame retardant are used as the raw material components, in the non-melt kneading zone of the extruder, it is especially preferred that the supply position of (C) the flame retardant is downstream from the supply port of (A) the polyphenylene ether-based resin. By supplying in this manner, the melt viscosity of (A) the polyphenylene ether-based resin can be controlled, and the weight average particle size of (B) the hydrogenated block copolymer can be controlled to the preferred range. Consequently, a thermoplastic resin composition having excellent impact resistance at low temperature and flame retardancy can be obtained. Therefore, it is preferred that the thermoplastic resin composition used in the present embodiment is a thermoplastic resin composition obtained by supplying and melt-kneading (C) the flame retardant on the downstream side of the supply port of (A) the polyphenylene ether-based resin in the non-melt kneading zone of the extruder.

Further, although if (C) the flame retardant is a liquid, it is preferred that the supply position of (C) the flame retardant is downstream from the supply port of (A) the polyphenylene ether-based resin, if (C) the flame retardant is a solid, the supply position of (C) the flame retardant may be the same as the supply port of (A) the polyphenylene ether-based resin.

In the case of blending (C) the flame retardant, the supply method and the supply position are especially important. Examples of a preferred supply method include: (1) supplying the flame retardant with the thermoplastic resin from a first raw material supply port; and (2) supplying the thermoplastic resin from a first raw material supply port that is on the upstream side of the extruder, and then supplying from a second raw material supply port provided in a non-melt kneading zone downstream from the first raw material supply port. Especially, when a liquid flame retardant is supplied from the second raw material supply port, it is preferred to provide a forward (phase 45° or less) kneading disc element (denoted by R) on the downstream side of the second raw material supply port, and mix the thermoplastic resin and the liquid flame retardant.

An example of side-feeding a liquid flame retardant is to feed from an injection nozzle on the side of the extruder using a gear pump, a plunger pump and the like.

The thermoplastic resin composition obtained by the above-described production method has excellent impact resistance at low temperature and flame retardancy. A connection structure for a solar power generation module obtained using this thermoplastic resin composition is capable of responding to market demands for greater thinness and compactness.

[Thermoplastic Resin Composition Crushed Product etc.]

As long as the thermoplastic resin composition used in the present embodiment contains components (A) to (C) in the above-described ranges, and satisfies the above-described properties, it may include a thermoplastic resin composition obtained by crushing a connection structure for a solar power generation module (hereinafter also referred to as a "thermoplastic resin composition crushed product").

Since the thermoplastic resin composition used in the connection structure for the solar power generation module according to the present embodiment has excellent properties such as thermal stability and humidity resistance, even when a thermoplastic resin composition crushed product obtained by crushing this connection structure is used, the required performance as a connection structure for a solar power generation module can be maintained.

Consequently, if the respective properties as measured by the evaluation methods described in the following Examples of a thermoplastic resin composition crushed product obtained by crushing a connection structure or unnecessary thermoplastic resin composition, such as a runner, produced during molding of the connection structure with a crusher, satisfy the above-described specific ranges, such a thermoplastic resin composition crushed product can be preferably used as a connection structure for a solar power generation module.

Although the performance of a connection structure obtained using a thermoplastic resin composition crushed product depends on the molding conditions, it is normally preferred to use a connection structure molded at 350° C. or less.

In the thermoplastic resin composition used in the present embodiment, the content of the thermoplastic resin composition crushed product may be an arbitrary ratio based on the required performance of the connection structure and the performance of the thermoplastic resin composition crushed product. For example, based on 100 parts by weight of unmolded thermoplastic resin composition pellets, it is preferred to use 100 parts by weight or less of thermoplastic resin composition crushed product, more preferably 50 parts by weight or less, and even more preferably 25 parts by weight or less.

EXAMPLES

The present invention will now be described based on the Examples. However, the present invention is not limited to the following examples.

The respective components used in the Examples and Comparative Examples were as follows.
[(A) Polyphenylene Ether-Based Resin]
(PPE)
Poly-2,6-dimethyl-1,4-phenylene ether: manufactured by Asahi Kasei Chemicals Corporation, trade name "Xyron S201A"
(PS)
Homopolystyrene: manufactured by PS Japan Corporation, trade name "PSJ-Polystyrene 685"
(HIPS)
High impact polystyrene: manufactured by PS Japan Corporation, trade name "PSJ-Polystyrene H9302"
[(B) Hydrogenated Block Copolymer]
Used were hydrogenated block copolymers (polystyrene-poly(ethylene-butylene)-polystyrene bond structure) obtained by hydrogenating the following styrene-butadiene block copolymers (polystyrene-polybutadiene-polystyrene bond structures).
(SEBS-1)
Hydrogenated block copolymer having a number average molecular weight of about 250,000, about 33 mass % of styrene polymer blocks, and a degree of hydrogenation of the butadiene unit of 98% or more: manufactured by Kraton Polymers LLC, trade name "Kraton G1651"
(SEBS-2)
Hydrogenated block copolymer having a number average molecular weight of about 80,000, about 60 mass % of styrene polymer blocks, and a degree of hydrogenation of the butadiene unit of 98% or more: manufactured by Kuraray Co., Ltd., trade name "Septon 8104"
(SEBS-3)
Hydrogenated block copolymer having a number average molecular weight of about 80,000, about 30 mass % of styrene polymer blocks, and a degree of hydrogenation of the butadiene unit of 98% or more: manufactured by Kraton Polymers LLC, registered trademark "Kraton G1650"
In the Examples, the number average molecular weight of component (B) was calculated based on molecular weight in terms of polystyrene measured by gel permeation chromatography (GPC).

[(C) Flame Retardant]

The following phosphate flame retardants were used.

(FR-1)

Bisphenol A-based condensed phosphate ester: manufactured by Daihachi Chemical Industry Co., Ltd., trade name "CR-741"

A phosphorous compound of the following chemical formula, in which those with n=1 was the main component (about 85% in terms of area ratio based on liquid chromatography analysis).

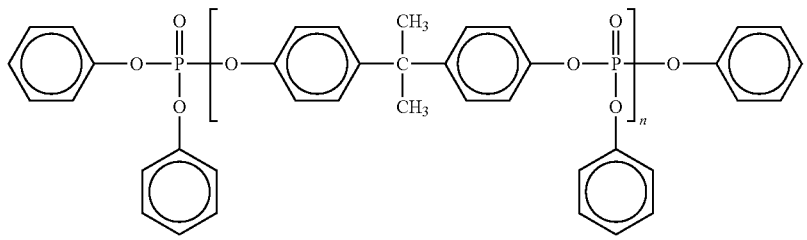

(FR-2)

Biphenyl-based condensed phosphate ester: manufactured by ADEKA Corporation, trade name "ADEKA Stab FP-800"

A phosphorous compound of the following chemical formula, in which those with N=1 was the main component (about 85% in terms of area ratio based on liquid chromatography analysis).

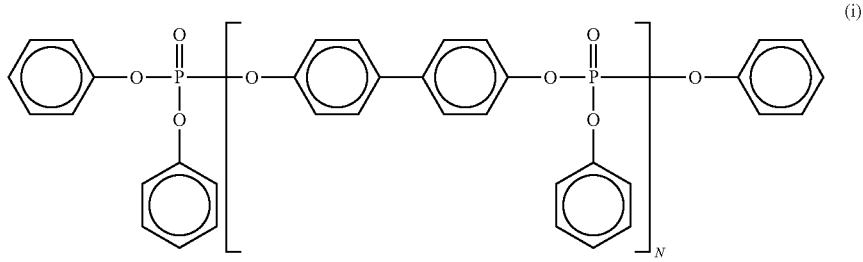

(FR-3)

Resorcinol-based condensed phosphate ester: manufactured by Daihachi Chemical Industry Co., Ltd., trade name "CR-733S"

A phosphorous compound in which the following chemical formula was the main component (about 70% in terms of area ratio based on liquid chromatography analysis).

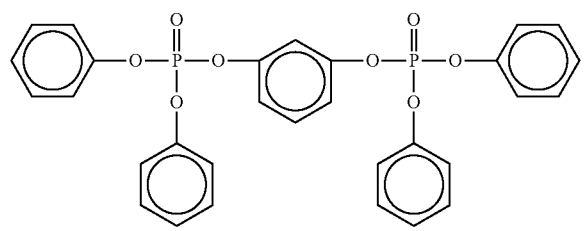

[(B') Polyolefin]

(LDPE)

Low-density polyethylene: manufactured by Asahi Kasei Chemicals Corporation, trade name "Suntec LD M2004"

(EP)

Ethylene-α-olefin copolymer: manufactured by Mitsui Chemicals, Inc., trade name "TAFMER P-0680J"

[(D) Thermal Stabilizer]

(STB-1)

Mixture blended at a ratio of 1/1 of zinc oxide/zinc sulfide (STB-2)

Hindered phenol-based antioxidant: manufactured by Toyotsu Chemiplas Corporation, trade name "IRGANOX 565"

(STB-3)

Phosphite-based antioxidant: manufactured by ADEKA Corporation, trade name "ADK STAB PEP36"

[(E) UV Absorber, Light Stabilizer]

(BTA)

Benzotriazole-based UV absorber: manufactured by Johoku Chemical Co., Ltd., trade name "JF-77P"

(HALS)

Hindered amine-based light stabilizer: manufactured by Johoku Chemical Co., Ltd., trade name "JF-90"

[Polycarbonate-based Resin]

Polycarbonate resin: manufactured by SABIC Innovative Plastics Holding IP (BV), trade name "Lexan EXL9330"

Evaluation of the properties of the resin compositions obtained in the Examples and the Comparative Examples was carried out based on the following methods under the following conditions.

(Test Piece Preparation)

Resin composition pellets obtained in the Examples and the Comparative Examples were dried for 2 hours at 100° C. Test pieces were prepared based on ISO-15103 using the IS-100GN model injection molding machine (cylinder temperature set at 280° C. and mold temperature set at 80° C.) manufactured by Toshiba Machine Co., Ltd., from the dried resin composition pellets.

(1) Charpy Impact Strength

Notched Charpy impact test pieces were prepared based on ISO-179 by cutting a notch (cut) in the center of the test pieces. The Charpy impact strength at 23° C. and −40° C. of these notched Charpy impact test pieces was measured based on ISO-179 as an evaluation of impact resistance.

(2) Thermal Aging Resistance Properties

Notched Charpy impact test pieces were prepared based on ISO-179 by cutting a notch (cut) in the center of the test pieces. These notched Charpy impact test pieces were subjected to thermal aging for 500 hours and 1,000 hours in an air-circulating oven set at 120° C. The test pieces were left for 24 hours at 23° C., 50% humidity, and then their Charpy impact strength at 23° C. was measured based on ISO-179 to calculate the level of change in impact resistance (retention rate based on Charpy impact strength before the thermal aging).

(3) Flexural Modulus

Using the above test pieces, the flexural modulus at 2 mm/minute was measured based on ISO-178.

(4) Vicat Softening Temperature

Using the above test pieces, the vicat softening temperature (hereinafter, also referred to as "VST") under 10 N was measured based on ISO-306 as an evaluation of heat resistance.

(5) Flame Retardancy

Test pieces for a flame test were prepared by molding the resin compositions obtained in the Examples and the Comparative Examples with the IS-100GN model injection molding machine (cylinder temperature set at 300° C. and mold temperature set at 80° C.) manufactured by Toshiba Machine Co., Ltd. A flame test was carried out using these test pieces, which had thicknesses of 0.75 mm and 2.5 mm, based on the vertical flame test stipulated in UL-94 of the UL standards. Five test pieces were exposed two times each to a direct flame, making a total of 10 times. The mean number of seconds and the maximum number of seconds for the flame to be extinguished were measured, and the test pieces were ranked as described below. The ranks were set in order from higher flame retardancy as V-0, V-1, V-2, and not V.

(Ranks)

The test was carried out on groups of 5 test pieces, and the burning time was measured a total of 10 times. Groups in which the burning time for every case was within 10 seconds, the total of the burning time for the times was within 50 seconds (mean burning time of within 5.0 seconds), and drips did not cause cotton to ignite were evaluated as "V-0." Groups in which the burning time for every case was within 30 seconds, the total of the burning time for the 10 times was within 250 seconds (mean burning time of within 25.0 seconds), and drips did not cause cotton to ignite were evaluated as "V-1." Groups in which the burning time for every case was within 30 seconds, the total of the burning time for the 10 times was within 250 seconds (mean burning time of within 25.0 seconds), but drips did cause cotton to ignite were evaluated as "V-2." Groups equal to or lower than this evaluation standard were evaluated as "not V."

(6) High-Temperature, High-Humidity Resistance Test

Notched Charpy impact test pieces were prepared based on ISO-179 by cutting a notch (cut) in the center of the test pieces. These notched Charpy impact test pieces were subjected to thermal aging for 2,000 hours in a high-temperature, high-humidity tank set to 85° C. and a relative humidity of 85%. The test pieces were left for 24 hours at 23° C., 50% humidity, and then their Charpy impact strength at 23° C. was measured based on ISO-179 to calculate the level of change in impact resistance (retention rate based on Charpy impact strength before the aging).

(7) Electrical Properties (CTI)

A tracking resistance test was carried out using the tracking resistance testing machine HAT-500-3 model apparatus manufactured by Hitachi Chemical Co., Ltd., based on UL 746A (ASTM D3638). Test pieces 65 mm×90 mm×3.0 mm in size (thickness of 3.0 mm) were obtained by molding the resin compositions obtained in the Examples and the Comparative Examples using an injection molding machine (manufactured by Toshiba Machine Co., Ltd: IS100GN). A tracking resistance test was carried out on the test pieces as follows.

A test piece was set in the HAT-500-3 model apparatus. A voltage of 100 to 600 V was applied in 25 V-steps from two electrodes contacting the surface of the test piece, and an aqueous solution of 0.1% ammonium chloride was dropped between the electrodes every 30 seconds. The number of drops of the aqueous solution of ammonium chloride until a current of 0.1 A or more flowed through (broken down) the test piece for 0.5 seconds or more was measured.

The tracking resistance test was carried out five times, and the voltage was measured at which the average value of the number of drops of the aqueous solution of ammonium chloride was less than 50 drops. Electrical properties were evaluated by classifying into classes 0 to 5 based on a comparative tracking index (CTI) according to the obtained voltage as described below.

(Classes)

0 V or more and less than 100 V: Class 5
100 V or more and less than 175 V: Class 4
175 V or more and less than 250 V: Class 3
250 V or more and less than 400 V: Class 2
400 V or more and less than 600 V: Class 1
600 V or more: Class 0

(8) Ammonia Resistance Test

Tensile test pieces were produced based on ISO-527 according to the test piece preparation described above. The test pieces were dipped for 24 hours in a 23° C. aqueous solution of 25 mass % ammonia, then removed, and the dissolved state of the surface of the test pieces was visually observed. Ammonia resistance was determined based on the following standards.

(Standards)

No dissolution of the test piece at all: A (excellent)
Slight dissolution of the test piece: B (good)
Substantial dissolution of the test piece: C (poor)

(9) Peel Property Test

Tensile test pieces were produced based on ISO-527 according to the test piece preparation described above. The test pieces were left for 24 hours in a room temperature of 23° C., 50% humidity state, and then broken by carrying out a bending test (repeatedly bending the test pieces back and forth) on the test pieces. The level of delamination of the fracture surface was visually observed, and determined based on the following standards.

(Standards)

No delamination on the fracture surface at all: A (excellent)
Slight delamination on the fracture surface: B (good)
Substantial delamination on the fracture surface: C (poor)

(10) Measurement of Weight Average Particle Size

The particle size of (B) the hydrogenated block copolymer dispersed in the resin composition obtained in the Examples and Comparative Examples was measured as follows.

Very thin strips were formed from the above-described Charpy impact test pieces. These very thin strips were dyed with ruthenium tetroxide, and a transmission electron microscope photograph was taken. Using a 25,000 times magnification photograph, the size of each particle of (B) the hydrogenated block copolymer dispersed in the resin composition was measured. From the measurement values, the weight average particle size of (B) the hydrogenated block copolymer was calculated as follows. At this stage, since the dispersed particle has an irregular shape, the size of each dispersed particle was determined by entering an estimate of the circle to which the area corresponded to, and substituting that estimate for the diameter.

In the 25,000 times magnification photograph, the dispersed particle having a diameter of 1 mm or more was counted. The reading ranges were 1 to 2 mm, 2 to 3 mm, 3 to 5 mm, 5 to 7 mm, 7 to 10 mm, 10 to 14 mm, 14 to 18 mm, and 18 to 22 mm. The mean diameter (Di) of each reading range was 0.06 µm, 0.10 µm, 0.16 µm, 0.24 µm, 0.34 µm, 0.48 µm, 0.64 µm, and 0.80 µm, respectively.

The weight average particle size was calculated based on the following formula from the mean diameter (Di) and the number (Ni) of each reading range.

$$\text{Weight average particle size } (\mu m) = \Sigma[(Di)^4 \times (Ni)]/\Sigma[(Di)^3 \times (Ni)]$$

(11) Heat Resistance Temperature (DTUL)

Using test pieces prepared based on ISO-15103, the heat resistance temperature (DTUL) was measured by a flatwise test under 1.80 Pa based on ISO-75-2 as an evaluation of heat resistance.

(12) Crushed Product Evaluation Method

Resin composition pellets obtained in the Examples were dried for 2 hours at 100° C. Test pieces were prepared based on ISO-15103 using the IS-100GN model injection molding machine (cylinder temperature set at 280° C. to 360° C. and mold temperature set at 80° C.) manufactured by Toshiba Machine Co., Ltd., from the dried resin composition pellets.

The prepared test pieces were crushed into the size of 2 to 10 mm using the 3HPMBC model crusher manufactured by Horai Co., Ltd., to obtain a resin composition crushed product.

The obtained resin composition crushed product was dried for 2 hours at 100° C. Test pieces were prepared based on ISO-15103 using the IS-100GN model injection molding machine (cylinder temperature set at 280° C. and mold temperature set at 80° C.) manufactured by Toshiba Machine Co., Ltd., from the dried resin composition crushed product. The test pieces were evaluated based on each of the above-described test methods.

Example 1

Resin composition pellets were obtained using a twin-screw extruder (TEM 58SS, manufactured by Toshiba Machine Co., Ltd.) having a screw diameter of 58 mm, 13 barrels, and a pressure reducing vent opening, by melt-kneading the respective components, and cooling and cutting an extruded strand. The supply method of the respective components during the melt kneading was as follows. First, 85 parts by mass of PPE as component (A), 15.0 parts by mass of SEBS-1 as component (B), 0.5 parts by mass of STB-1 as component (D), and 1.0 part by mass of LDPE as component (B') were supplied from a first supply port in a barrel 1 on the upstream side of the extruder in the flow direction. Then, 20 parts by mass of FR-1 as component (C) was supplied to the side of the extruder from an injection nozzle using a gear pump from a second (liquid) supply port in a barrel 5 on the downstream side from the first supply port.

Next, the obtained resin composition pellet was evaluated based on the above-described evaluation methods. The evaluation results are shown in Table 2.

The screw configuration and the like of the twin-screw extruder were as follows.

The configuration of the twin-screw extruder was, in order from the upstream side, configured from a non-melt kneading zone (front stage) where the thermoplastic resin was not melted, and a melt kneading zone (rear stage). Further, the non-melt kneading zone was 70% based on the total barrel length of the extruder of 100%. The screw configuration of the melt kneading zone was, in order from the upstream side, two forward (phase 45°) kneading disc elements (denoted by R), one orthogonal (phase 90°) kneading disc element (denoted by N), and one reverse (negative phase 45°) kneading disc element (denoted by L). The screw configuration of the non-melt kneading zone had two elements of, in order from the upstream side, a forward screw element and a forward (phase 45°) kneading disc element (denoted by R). Further, in the non-melt kneading zone, the FR-1 as component (C) was fed from the second supply port, and the forward (phase 45°) kneading disc element (denoted by R) was arranged down from where the component (C) was fed.

A vacuum degassing zone was provided in a barrel 11. The second supply port degassed under vacuum to −900 hPa for supplying the FR-1 (phosphate) as component (C) was provided in the barrel 5. Extrusion was carried out by setting the barrel temperature settings to cold water for barrel 1, 100° C. for barrel 2, 200° C. for barrels 3 to 6, 250° C. for barrel 7, 270° C. for barrel 8, and 280° C. for barrels 9 to 13, the die to 290° C., the screw rotating speed to 350 rpm, and the discharge rate (extrusion rate) to 400 kg/hr.

Examples 2 to 10 and Comparative Examples 1 to 5

Resin composition pellets were produced in the same manner as in Example 1, except that the blend composition shown in Table 1 or Table 3 was used. The obtained resin composition pellets were evaluated based on the above-described evaluation methods. The evaluation results are shown in Table 2 or Table 4.

Comparative Example 6

Resin composition pellets were produced in the same manner as in Example 1, except that component (C) was not used. The obtained resin composition pellets were evaluated based on the above-described evaluation methods. The evaluation results are shown in Table 4.

Example 11

Resin composition pellets were produced in the same manner as in Example 2, except that FR-2 was used as component (C) instead of FR-1, and the FR-2 was supplied with the other components from the first supply port. The obtained resin composition pellets were evaluated based on the above-described evaluation methods. The evaluation results are shown in Table 6.

Example 12

Resin composition pellets were produced in the same manner as in Example 2, except that FR-3 was used as component (C) instead of FR-1. The obtained resin composition pellets were evaluated based on the above-described evaluation methods. The evaluation results are shown in Table 6.

Example 13

Resin composition pellets were produced in the same manner as in Example 2, except that the blend composition shown in Table 5 was used. The obtained resin composition pellets were evaluated based on the above-described evaluation methods. The evaluation results are shown in Table 6.

Example 14

Resin composition pellets were produced in the same manner as in Example 13, except that the amounts of SEBS-1 as component (B) and the LDPE as component (B') to be blended were changed to those shown in Table 5. The obtained resin composition pellets were evaluated based on the above-described evaluation methods. The evaluation results are shown in Table 6.

Example 15

Resin composition pellets were produced in the same manner as in Example 13, except that a part of the SEBS-1 as component (B) was substituted with SEBS-2 in the proportion shown in Table 5. The obtained resin composition pellets were evaluated based on the above-described evaluation methods. The evaluation results are shown in Table 6.

Example 16

Resin composition pellets were produced in the same manner as in Example 13, except that a part of the SEBS-1 as component (B) was substituted with SEBS-3 in the proportion shown in Table 5. The obtained resin composition pellets were evaluated based on the above-described evaluation methods. The evaluation results are shown in Table 6.

Example 17

Resin composition pellets were produced in the same manner as in Example 13, except that the LDPE as component (B') was changed to EP. The evaluation results obtained by evaluating the obtained resin composition pellets based on the above-described evaluation methods are shown in Table 6.

Example 18

Resin composition pellets were produced in the same manner as in Example 13, except that the STB-1 as component (D) was changed to STB-2 and STB-3 in the proportion shown in Table 5. The obtained resin composition pellets were evaluated based on the above-described evaluation methods. The evaluation results are shown in Table 6.

Example 19

Resin composition pellets were produced in the same manner as in Example 13, except that BTA and HALS were added as component (E) in the proportion shown in Table 5. The obtained resin composition pellets were evaluated based on the above-described evaluation methods. The evaluation results are shown in Table 6. Component (E) was supplied from the first supply port.

Example 20

Resin composition pellets were produced in the same manner as in Example 13, except that a part of the PPE as component (A) was substituted with PS in the proportion shown in Table 5. The obtained resin composition pellets were evaluated based on the above-described evaluation methods. The evaluation results are shown in Table 6.

Comparative Example 7

Resin composition pellets were produced in the same manner as in Example 13, except that the amounts of SEBS-1 as component (B) and the LDPE as component (B') to be blended were changed to those shown in Table 7. The obtained resin composition pellets were evaluated based on the above-described evaluation methods. The evaluation results are shown in Table 8.

Comparative Example 8

Resin composition pellets were produced in the same manner as in Example 16, except that as component (B) the amounts of a part of the SEBS-1 and of the SEBS-3 to be blended were changed to those shown in Table 7. The obtained resin composition pellets were evaluated based on the above-described evaluation methods. The evaluation results are shown in Table 8.

Comparative Example 9

Resin composition pellets were produced in the same manner as in Example 13, except that the amounts of PPE and PS as component (A) to be blended were changed to those shown in Table 7. The obtained resin composition pellets were evaluated based on the above-described evaluation methods. The evaluation results are shown in Table 8.

Comparative Examples 10 to 12

Resin composition pellets were produced in the same manner as in Example 2, except that the blend compositions shown in Table 7 were used. The obtained resin composition pellets were evaluated based on the above-described evaluation methods. The evaluation results are shown in Table 8.

Comparative Example 13

"Lexan EXL9330" (trade name) manufactured by SABIC Innovative Plastics Holding IP (BV) was evaluated based on the above-described evaluation methods. The evaluation results are shown in Table 8.

Example 21

Resin composition pellets were produced in the same manner as in Example 1, except that the oxygen concentration at the first supply port was changed to 8%. The obtained resin composition pellets were evaluated based on the above-described evaluation methods. The evaluation results are shown in Table 10.

Example 22

Resin composition pellets were produced in the same manner as in Example 2, except that the screw configuration and the like of the extruder were set so that the non-melt kneading zone was 50% of the total barrel length, the barrel temperature settings were set to cold water for barrel 1, 100° C. for barrel 2, 200° C. for barrels 3 and 4, 250° C. for barrel 5, 270° C. for barrel 6, and 280° C. for barrels 7 to 13, and the die was set to 290° C. The obtained resin composition pellets were evaluated based on the above-described evaluation methods. The evaluation results are shown in Table 10.

Example 23

Resin composition pellets were produced in the same manner as in Example 22, except that the screw rotating speed was set to 500 rpm. The obtained resin composition pellets were evaluated based on the above-described evaluation methods. The evaluation results are shown in Table 10.

Comparative Examples 14 and 15

Resin composition pellets were produced in the same manner as in Example 1, except that the oxygen concentration at the first supply port was changed to that shown in Table 11. The obtained resin composition pellets were evaluated based on the above-described evaluation methods. The evaluation results are shown in Table 12.

Comparative Example 16

Resin composition pellets were produced in the same manner as in Example 2, except that the addition position of the FR-1 as component (C) was changed to barrel 12 which was after the PPE was melted. The obtained resin composition pellets were evaluated based on the above-described evaluation methods. The evaluation results are shown in Table 12.

Comparative Example 17

Resin composition pellets were produced in the same manner as in Example 22, except that the addition position of the FR-1 as component (C) was changed to barrel 12 which was after the PPE was melted. The obtained resin composition pellets were evaluated based on the above-described evaluation methods. The evaluation results are shown in Table 12.

Comparative Example 18

Resin composition pellets were produced in the same manner as in Example 2, except that the screw configuration and the like of the twin-screw extruder were changed as described below. The obtained resin composition pellets were evaluated based on the above-described evaluation methods. The evaluation results are shown in Table 12.

(Screw Configuration and the Like of the Twin-Screw Extruder)

The configuration of the twin-screw extruder was, in order from the upstream side, configured from a non-melt kneading zone (front stage) where the thermoplastic resin was not melted, and a melt kneading zone (rear stage). Further, the non-melt kneading zone was 35% based on the total barrel length of the extruder of 100%. The screw configuration of the melt kneading zone was two forward (phase 45°) kneading disc elements (denoted by R), one orthogonal (phase 90°) kneading disc element (denoted by N), and one reverse (negative phase 45°) kneading disc element (denoted by L). In the non-melt kneading zone, a forward screw element was used in the screw configuration. The screw configuration of the front half of the melt kneading zone was, in order from the upstream side, one forward (phase 45°) kneading disc element (denoted by R), one orthogonal (phase 90°) kneading disc element (denoted by N), and one reverse (negative phase 45°) kneading disc element (denoted by L). The screw configuration of the rear half of the melt kneading zone was two forward (phase 45°) kneading disc elements (denoted by R), one orthogonal (phase 90°) kneading disc element (denoted by N), and one reverse (negative phase 45°) kneading disc element (denoted by L). Further, in the melt kneading zone, the FR-1 as component (C) was fed from the second supply port, and the screw configuration of the rear half of the melt kneading zone (two forward (phase 45°) kneading disc elements (denoted by R), one orthogonal (phase 90°) kneading disc element (denoted by N), and one reverse (negative phase 45°) kneading disc element (denoted by L)) was arranged down from where the component (C) was fed.

A vacuum degassing zone was provided in a barrel 11. The second supply port degassed under vacuum to −900 hPa for supplying the FR-1 (phosphate) as component (C) was provided in a barrel 9. Extrusion was carried out by setting the barrel temperature settings to cold water for barrel 1, 200° C. for barrel 2, 250° C. for barrel 3, and 280° C. for barrels 4 to 13, the die to 290° C., the screw rotating speed to 350 rpm, and the discharge rate to 400 kg/hr.

Comparative Example 19

An attempt was made to produce resin composition pellets in the same manner as in Example 22, except that the screw rotating speed was set to 250 rpm, but resin composition pellets could not be obtained because extrusion could not be carried out.

Comparative Example 20

Resin composition pellets were produced in the same manner as in Example 22, except that the screw rotating speed was set to 650 rpm. The obtained resin composition pellets were evaluated based on the above-described evaluation methods. The evaluation results are shown in Table 12.

Examples 24 and 25, and Comparative Example 21

Using resin composition pellets produced in the same manner as in Example 2, a test piece for crushing was prepared with a molding machine in which the cylinder temperature had been set to the temperature shown in Table 13. The test piece for crushing was then crushed to obtain a resin composition crushed product. The obtained resin composition crushed product was evaluated based on the above-described evaluation methods. The evaluation results are shown in Table 13.

TABLE 1

| (Composition) | Component: parts by mass | Example 1 | Example 2 | Example 3 | Example 4 | Example 5 | Example 6 | Example 7 | Example 8 | Example 9 | Example 10 |
|---|---|---|---|---|---|---|---|---|---|---|---|
| (A) | PPE | 85.0 | 82.5 | 80.0 | 77.5 | 74.0 | 85.0 | 85.0 | 85.0 | 77.5 | 77.5 |
| (B) | SEBS-1 | 15.0 | 17.5 | 20.0 | 22.5 | 26.0 | 15.0 | 15.0 | 15.0 | 22.5 | 22.5 |
| (B') | LDPE | 1.0 | 1.0 | 1.0 | 1.0 | 1.0 | 1.0 | 1.0 | 1.0 | 1.0 | 1.0 |
| (C) | FR-1 | 20.0 | 20.0 | 20.0 | 20.0 | 20.0 | 6.0 | 14.0 | 17.5 | 20.0 | 25.0 |
| (D) | STB-1 | 0.5 | 0.5 | 0.5 | 0.5 | 0.5 | 0.5 | 0.5 | 0.5 | 0.5 | 0.5 |
| TOTAL (Melt Extrusion) | | 121.5 | 121.5 | 121.5 | 121.5 | 121.5 | 107.5 | 115.5 | 119.0 | 121.5 | 126.5 |
| Die Outlet Resin Temperature ° C. | | 324 | 325 | 329 | 331 | 334 | 342 | 342 | 342 | 335 | 329 |

TABLE 2

|  |  | | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| Weight Average Particle Size of Component (B) | | μm | 0.4 | 0.5 | 0.5 | — | — | 0.35 | — | — | 0.5 | 0.5 |
| (Material Properties of Composition) | | | | | | | | | | | | |
| Charpy Impact | 23° C. | kJ/m² | 36.0 | 40.0 | 43.0 | 46.0 | 47.0 | 37.0 | 36.0 | 36.0 | 46.0 | 46.0 |
|  | −40° C. | kJ/m² | 15.5 | 19.0 | 22.0 | 23.0 | 23.5 | 16.5 | 16.0 | 15.5 | 23.0 | 23.0 |
| (Thermal Aging Resistance) | | | | | | | | | | | | |
| 120° C. | Charpy Impact | kJ/m² | 25.0 | 29.0 | 32.0 | 32.0 | 33.0 | 24.0 | 24.0 | 24.5 | 30.0 | 30.0 |
| 500 hr | Retention Rate | % | 69 | 73 | 74 | 70 | 70 | 65 | 67 | 68 | 65 | 65 |
| 120° C. | Charpy Impact | kJ/m² | 21.0 | 25.0 | 27.0 | 26.0 | 26.0 | 18.0 | 19.5 | 20.0 | 25.0 | 25.0 |
| 1000 hr | Retention Rate | % | 58 | 63 | 63 | 57 | 55 | 49 | 54 | 56 | 54 | 54 |
| Flexural Modulus | ISO178 | MPa | 2400 | 2310 | 2230 | 2150 | 2150 | 2150 | 2150 | 2150 | 2200 | 2200 |
| VSP | ISO306, 10N | ° C. | 149 | 146 | 143 | 141 | 139 | 179 | 160 | 154 | 140 | 132 |
| DTUL | ISO75-2 |  | — | 105 | 105 | — | — | — | — | — | — | 99 |
| Flame retardancy | UL-94, 0.75 mm | Rank | V-0 | V-0 | V-0 | V-1 | V-1 | V-1 | V-1 | V-0 | V-0 | V-0 |
|  | UL-94, 2.5 mm | Rank | V-0 | V-0 | V-0 | V-0 | V-1 | V-1 | V-0 | V-0 | V-0 | V-0 |
| (Humidity Resistance) | | | | | | | | | | | | |
| 85° C., 85% 2000 hr Retention Rate | | % | 86 | 85 | 85 | 84 | 83 | 85 | — | — | — | 85 |
| CTI |  |  | — | 0 | 0 | 0 | — | 0 | 0 | 1 | 1 | 1 |
| Peel Property |  |  | A | A | A | B | C | A | A | A | A | B |

In Table, "—" indicates that measurement was not carried out.

TABLE 3

| (Composition) | Component: parts by mass | Comparative Example 1 | Comparative Example 2 | Comparative Example 3 | Comparative Example 4 | Comparative Example 5 | Comparative Example 6 |
|---|---|---|---|---|---|---|---|
| (A) | PPE | 87.5 | 69.0 | 85.0 | 85.0 | 77.5 | 85.0 |
| (B) | SEBS-1 | 12.5 | 31.0 | 15.0 | 15.0 | 22.5 | 15.0 |
| (B') | LDPE | 1.0 | 1.0 | 1.0 | 1.0 | 1.0 | 1.0 |
| (C) | FR-1 | 20.0 | 20.0 | 3.0 | 32.5 | 35.0 | 15.0 |
| (D) | STB-1 | 0.5 | 0.5 | 0.5 | 0.5 | 0.5 | 0.5 |
| TOTAL |  | 121.5 | 121.5 | 104.5 | 134.0 | 136.5 | 101.5 |
| (Melt Extrusion) | | | | | | | |
| Die Outlet Resin Temperature | ° C. | 338 | 335 | 356 | 333 | 329 | 363 |

TABLE 4

|  |  | | Comparative Example 1 | Comparative Example 2 | Comparative Example 3 | Comparative Example 4 | Comparative Example 5 | Comparative Example 6 |
|---|---|---|---|---|---|---|---|---|
| Weight Average Particle Size of Component (B) | | μm | — | — | 0.27 | 0.35 | — | 0.25 |
| (Material Properties of Composition) | | | | | | | | |
| Charpy Impact | 23° C. | kJ/m² | 29.0 | 49.0 | 35.0 | 30.0 | 41.0 | 33.5 |
|  | −40° C. | kJ/m² | 9.0 | 25.0 | 14.5 | 11.5 | 20.5 | 12.0 |
| (Thermal Aging Resistance) | | | | | | | | |
| 120° C. | Charpy Impact | kJ/m² | 19.5 | 34.0 | 19.0 | 19.0 | Measurement Not Possible | 18.0 |
| 500 hr | Retention Rate | % | 67 | 69 | 54 | 63 | — | 54 |
| 120° C. | Charpy Impact | kJ/m² | 17.0 | 28.0 | 15.0 | 15.0 | Measurement Not Possible | 12.0 |
| 1000 hr | Retention Rate | % | 59 | 57 | 43 | 50 | — | 36 |
| Flexural Modulus | ISO178 | MPa | 2400 | 2000 | 2150 | 2150 | 2200 | 2280 |
| VSP | ISO306, 10N | ° C. | 144 | 132 | 185 | 130 | 126 | 188 |
| DTUL | ISO75-2 |  | — | — | — | — | 91 | — |
| Flame retardancy | UL-94, 0.75 mm | Rank | V-0 | notV | notV | V-0 | V-0 | notV |
|  | UL-94, 2.5 mm | Rank | V-0 | notV | notV | V-0 | V-0 | notV |
| (Humidity Resistance) | | | | | | | | |
| 85° C., 85% 2000 hr Retention Rate | | % | 82 | 80 | 80 | 80 | 79 | 63 |
| CTI |  |  | — | 0 | — | — | 2 | — |
| Peel Property |  |  | A | C | A | A | C | A |

In Table, "—" indicates that measurement was not carried out.

TABLE 5

| (Composition) | Component: parts by mass | Example 2 | Example 11 | Example 12 | Example 13 | Example 14 | Example 15 | Example 16 | Example 17 | Example 18 | Example 19 | Example 20 |
|---|---|---|---|---|---|---|---|---|---|---|---|---|
| (A) | PPE | 82.5 | 82.5 | 82.5 | 82.5 | 82.5 | 82.5 | 82.5 | 82.5 | 82.5 | 82.5 | 70.0 |
|  | PS |  |  |  |  |  |  |  |  |  |  | 12.5 |
|  | HIPS |  |  |  |  |  |  |  |  |  |  |  |
| (B) | SEBS-1 | 17.5 | 17.5 | 17.5 | 17.5 | 12.5 | 12.5 | 12.5 | 17.5 | 17.5 | 17.5 | 17.5 |
|  | SEBS-2 |  |  |  |  |  |  | 5.0 |  |  |  |  |
|  | SEBS-3 |  |  |  |  |  | 5.0 |  |  |  |  |  |
| (B') | LDPE | 1.0 | 1.0 | 1.0 | 1.0 | 6.0 | 1.0 | 1.0 |  | 1.0 | 1.0 | 1.0 |
|  | EP |  |  |  |  |  |  |  | 1.0 |  |  |  |
| (C) | FR-1 | 20.0 |  |  | 10.0 | 10.0 | 10.0 | 10.0 | 10.0 | 10.0 | 10.0 | 10.0 |
|  | FR-2 |  | 20.0 |  |  |  |  |  |  |  |  |  |
|  | FR-3 |  |  | 20.0 |  |  |  |  |  |  |  |  |
| (D) | STB-1 | 0.5 | 0.5 | 0.5 | 0.5 | 0.5 | 0.5 | 0.5 | 0.5 |  | 0.5 | 0.5 |
|  | STB-2 |  |  |  |  |  |  |  |  | 0.5 |  |  |
|  | STB-3 |  |  |  |  |  |  |  |  | 0.5 |  |  |
| (E) | BTA |  |  |  |  |  |  |  |  |  | 0.5 |  |
|  | HALS |  |  |  |  |  |  |  |  |  | 0.5 |  |
| TOTAL |  | 121.5 | 121.5 | 121.5 | 111.5 | 111.5 | 111.5 | 111.5 | 111.5 | 112.0 | 112.5 | 111.5 |
| (Melt Extrusion Conditions) |  |  |  |  |  |  |  |  |  |  |  |  |
| Die Outlet Resin Temperature | °C. | 325 | 327 | 328 | 338 | 337 | 333 | 332 | 338 | 337 | 336 | 335 |

TABLE 6

|  |  |  | Example 2 | Example 11 | Example 12 | Example 13 | Example 14 | Example 15 | Example 16 | Example 17 | Example 18 | Example 19 | Example 20 |
|---|---|---|---|---|---|---|---|---|---|---|---|---|---|
| Weight Average Particle Size of Component (B) |  | μm | 0.5 | — | — | — | 0.4 | — | — | — | — | — | — |
| (Material Properties of Composition) |  |  |  |  |  |  |  |  |  |  |  |  |  |
| Charpy Impact | 23° C. | kJ/m$^2$ | 40.0 | 44.0 | 42.0 | 41.0 | 36.0 | 37.0 | 38.0 | 42.0 | 41.0 | 41.0 | 37.0 |
|  | −40° C. | kJ/m$^2$ | 19.0 | 21.0 | 19.0 | 19.0 | 15.5 | 15.5 | 15.5 | 19.5 | 20.0 | 19.0 | 15.5 |
| (Thermal Aging Resistance) |  |  |  |  |  |  |  |  |  |  |  |  |  |
| 120° C. 500 hr | Charpy Impact | kJ/m$^2$ | 29.0 | 33.0 | 30.0 | 24.0 | 24.0 | 24.0 | 24.0 | 24.5 | 28.0 | 27.0 | 23.0 |
|  | Retention Rate | % | 73 | 75 | 71 | 59 | 67 | 65 | 63 | 58 | 68 | 66 | 62 |
| 120° C. 1000 hr | Charpy Impact | kJ/m$^2$ | 25.0 | 27.0 | 22.0 | 21.0 | 17.0 | 19.0 | 18.0 | 22.0 | 24.5 | 24.0 | 20.0 |
|  | Retention Rate | % | 63 | 61 | 52 | 51 | 47 | 51 | 47 | 52 | 60 | 59 | 54 |
| Flexural Modulus | ISO178 | MPa | 2310 | 2350 | 2200 | 2250 | 2350 | 2300 | 2300 | 2250 | 2240 | 2250 | 2250 |
| VSP | ISO306, 10N | °C. | 146 | 152 | 144 | 166 | 165 | 166 | 166 | 167 | 166 | 166 | 158 |
| Flame retardancy | UL-94, 0.75 mm | Rank | V-0 | V-0 | V-0 | V-1 | V-1 | V-1 | V-1 | V-1 | V-1 | V-1 | notV |
|  | UL-94, 2.5 mm | Rank | V-0 | V-0 | V-0 | V-1 | V-1 | V-1 | V-1 | V-1 | V-1 | V-1 | V-1 |
| (Humidity Resistance) |  |  |  |  |  |  |  |  |  |  |  |  |  |
| 85° C., 85% 2000 hr Retention Rate |  | % | 85 | 85 | 68 | 83 | 82 | 80 | 83 | 85 | 88 | 85 | — |
| Ammonia Resistance |  |  | A | A | A | A | A | A | A | A | A | A | A |
| CTI |  |  | 0 | 0 | 1 | 0 | 1 | 1 | 1 | 0 | 0 | 0 | 1 |

In Table, "—" indicates that measurement was not carried out.

TABLE 7

| (Composition) | Component: parts by mass | Comparative Example 7 | Comparative Example 8 | Comparative Example 9 | Comparative Example 10 | Comparative Example 11 | Comparative Example 12 |
|---|---|---|---|---|---|---|---|
| (A) | PPE | 82.5 | 82.5 | 60.0 | 85.0 | 80.0 | 87.0 |
|  | PS |  |  | 22.5 | 7.5 |  | 4.0 |
|  | HIPS |  |  |  |  | 17.5 |  |
| (B) | SEBS-1 | 7.5 | 7.5 | 17.5 | 7.5 | 2.5 | 9.0 |
|  | SEBS-2 |  |  |  |  |  |  |
|  | SEBS-3 |  | 10.0 |  |  |  |  |
| (B') | LDPE | 11.0 | 1.0 | 1.0 | 1.0 | 1.0 |  |
|  | EP |  |  |  |  |  |  |
| (C) | FR-1 | 10.0 | 10.0 | 10.0 | 14.0 | 14.0 | 14.0 |
|  | FR-2 |  |  |  |  |  |  |
|  | FR-3 |  |  |  |  |  |  |

TABLE 7-continued

| (Composition) | Component: parts by mass | Comparative Example 7 | Comparative Example 8 | Comparative Example 9 | Comparative Example 10 | Comparative Example 11 | Comparative Example 12 |
|---|---|---|---|---|---|---|---|
| (D) | STB-1 | 0.5 | 0.5 | 0.5 | 0.5 | 0.5 | |
| | STB-2 | | | | | | 0.6 |
| | STB-3 | | | | | | 0.6 |
| (E) | BTA | | | | | | |
| | HALS | | | | | | |
| TOTAL | | 111.5 | 111.5 | 111.5 | 115.5 | 115.5 | 115.2 |
| (Melt Extrusion Conditions) | | | | | | | |
| Die Outlet Resin Temperature | °C. | 335 | 332 | 330 | 345 | 345 | 349 |

TABLE 8

| | | Comparative Example 7 | Comparative Example 8 | Comparative Example 9 | Comparative Example 10 | Comparative Example 11 | Comparative Example 12 | Comparative Example 13 |
|---|---|---|---|---|---|---|---|---|
| Weight Average Particle Size of Component (B) | μm | 0.4 | — | — | 0.25 | — | — | — |
| (Material Properties of Composition) | | | | | | | | |
| Charpy Impact 23° C. | kJ/m² | 32.0 | 25.0 | 35.0 | 20.0 | 15.0 | 24.0 | 60.0 |
| −40° C. | kJ/m² | 11.0 | 10.0 | 14.5 | 7.0 | 6.0 | 9.0 | 25.0 |
| (Thermal Aging Resistance) | | | | | | | | |
| 120° C. 500 hr Charpy Impact | kJ/m² | 19.0 | 14.0 | 21.0 | 13.0 | 8.0 | 16.0 | 16.0 |
| Retention Rate | % | 59 | 56 | 60 | 65 | 53 | 67 | 27 |
| 120° C. 1000 hr Charpy Impact | kJ/m² | 15.0 | 12.0 | 19.0 | 12.0 | 3.5 | 14.0 | 14.0 |
| Retention Rate | % | 47 | 48 | 54 | 60 | 23 | 58 | 23 |
| Flexural Modulus ISO178 | MPa | 2350 | 2300 | 2350 | 2750 | 2700 | 2500 | 2300 |
| VSP ISO306, 10N | °C. | — | — | 142 | 160 | 145 | — | 148 |
| Flame retardancy UL-94, 0.75 mm | Rank | notV | V-1 | notV | V-0 | V-0 | V-0 | V-1 |
| UL-94, 2.5 mm | Rank | V-1 | V-1 | notV | V-0 | V-0 | V-0 | V-0 |
| (Humidity Resistance) | | | | | | | | |
| 85° C., 85% 2000 hr Retention Rate | % | 80 | 83 | 78 | 80 | 67 | 82 | 16 |
| Ammonia Resistance | | A | A | A | A | A | A | C |
| CTI | | 2 | 2 | 0 | 2 | 1 | 2 | 3 |

In Table, "—" indicates that measurement was not carried out.

TABLE 9

| (Composition) | Component: parts by mass | | Example 1 | Example 21 | Example 2 | Example 22 | Example 23 |
|---|---|---|---|---|---|---|---|
| (A) | PPE | | 85.0 | 85.0 | 82.5 | 82.5 | 82.5 |
| (B) | SEBS-1 | | 15.0 | 15.0 | 17.5 | 17.5 | 17.5 |
| (B') | LDPE | | 1.0 | 1.0 | 1.0 | 1.0 | 1.0 |
| (C) | FR-1 | | 20.0 | 20.0 | 20.0 | 20.0 | 20.0 |
| (D) | STB-1 | | 0.5 | 0.5 | 0.5 | 0.5 | 0.5 |
| TOTAL | | | 121.5 | 121.5 | 121.5 | 121.5 | 121.5 |
| (Melt Extrusion Conditions) | | | | | | | |
| Front Stage | Front Ratio | % | 70 | 70 | 70 | 50 | 50 |
| | Front Temperature | °C. | 200 | 200 | 200 | 200 | 200 |
| | Screw Element | | RR | RR | RR | RR | RR |
| Rear Stage | Rear Ratio | % | 30 | 30 | 30 | 50 | 50 |
| | Rear Temperature | °C. | 280 | 280 | 280 | 280 | 280 |
| | Screw Element | | RRNL | RRNL | RRNL | RRNL | RRNL |
| Screw Rotating Speed | | rpm | 350 | 350 | 350 | 350 | 500 |
| Extrusion Rate | | kg/hr | 400 | 400 | 400 | 400 | 400 |
| Component (C) Addition Position | | | Barrel 5 | Barrel 5 | Barrel 5 | Barrel 5 | Barrel 5 |
| First Supply Port Oxygen Concentration | | % | 3.0 | 8.0 | 3.0 | 3.0 | 3.0 |
| Die Outlet Resin Temperature | | °C. | 324 | 324 | 325 | 336 | 336 |

TABLE 10

|  |  |  | Example 1 | Example 21 | Example 2 | Example 22 | Example 23 |
|---|---|---|---|---|---|---|---|
| Weight Average Particle Size of Component (B) | | μm | 0.4 | — | 0.5 | 0.45 | 0.45 |
| (Material Properties of Composition) | | | | | | | |
| Charpy Impact | 23° C. | kJ/m$^2$ | 36.0 | 35.5 | 40.0 | 38.0 | 38.0 |
|  | −40° C. | kJ/m$^2$ | 15.5 | 15.5 | 19.0 | 18.5 | 18.0 |
| (Thermal Aging Resistance) | | | | | | | |
| 120° C. | Charpy Impact | kJ/m$^2$ | 25.0 | 23.5 | 29.0 | 26.0 | 25.5 |
| 500 hr | Retention Rate | % | 69 | 66 | 73 | 68 | 67 |
| 120° C. | Charpy Impact | kJ/m$^2$ | 21.0 | 19.0 | 25.0 | 21.0 | 20.5 |
| 1000 hr | Retention Rate | % | 58 | 54 | 63 | 55 | 54 |
| Flexural Modulus | ISO178 | MPa | 2400 | 2400 | 2310 | 2300 | 2300 |
| VSP | ISO306, 10N | ° C. | 149 | | 146 | 145 | 145 |
| Flame retardancy | UL-94, 0.75 mm | Rank | V-0 | V-0 | V-0 | V-0 | V-0 |
|  | UL-94, 2.5 mm | Rank | V-0 | V-0 | V-0 | V-0 | V-0 |
| (Humidity Resistance) | | | | | | | |
| 85° C., 85% 2000 hr Retention Rate | | % | 86 | — | 85 | 80 | 80 |

In Table, "—" indicates that measurement was not carried out.

TABLE 11

| (Composition) | Component: parts by mass | | Comparative Example 14 | Comparative Example 15 | Comparative Example 16 | Comparative Example 17 | Comparative Example 18 | Comparative Example 19 | Comparative Example 20 |
|---|---|---|---|---|---|---|---|---|---|
| (A) | PPE | | 85.0 | 85.0 | 82.5 | 82.5 | 82.5 | 82.5 | 82.5 |
| (B) | SEBS-1 | | 15.0 | 15.0 | 17.5 | 17.5 | 17.5 | 17.5 | 17.5 |
| (B') | LDPE | | 1.0 | 1.0 | 1.0 | 1.0 | 1.0 | 1.0 | 1.0 |
| (C) | FR-1 | | 20.0 | 20.0 | 20.0 | 20.0 | 20.0 | 20.0 | 20.0 |
| (D) | STB-1 | | 0.5 | 0.5 | 0.5 | 0.5 | 0.5 | 0.5 | 0.5 |
| TOTAL | | | 121.5 | 121.5 | 121.5 | 121.5 | 121.5 | 121.5 | 121.5 |
| (Melt Extrusion Conditions) | | | | | | | | | |
| Front Stage | Front Ratio | % | 70 | 70 | 70 | 50 | 35 | 50 | 50 |
|  | Front Temperature | ° C. | 200 | 200 | 200 | 200 | 250 | 200 | 200 |
|  | Screw Element | | RR | RR | RR | RR | RNL | RR | RR |
| Rear Stage | Rear Ratio | % | 30 | 30 | 30 | 50 | 65 | 50 | 50 |
|  | Rear Temperature | ° C. | 280 | 280 | 280 | 280 | 280 | 280 | 280 |
|  | Screw Element | | RRNL | RRNL | RRNL | RRNL | RRNL | RRNL | RRNL |
| Screw Rotating Speed | | rpm | 350 | 350 | 350 | 350 | 350 | 250 | 650 |
| Extrusion Rate | | kg/hr | 400 | 400 | 400 | 400 | 400 | 400 | 400 |
| Component (C) Addition Position | | | Barrel 5 | Barrel 5 | Barrel 12 | Barrel 12 | Barrel 5 | Barrel 5 | Barrel 5 |
| First Supply Port Oxygen Concentration | | % | 13.0 | 18.0 | 3.0 | 3.0 | 3.0 | 3.0 | 3.0 |
| Die Outlet Resin Temperature | | ° C. | 326 | 328 | 353 | 350 | 350 | — | 355 |

TABLE 12

|  |  | Comparative Example 14 | Comparative Example 15 | Comparative Example 16 | Comparative Example 17 | Comparative Example 18 | Comparative Example 19 | Comparative Example 20 |
|---|---|---|---|---|---|---|---|---|
| Weight Average Particle Size of Component (B) | μm | — | — | 0.25 | — | 0.25 | Extrusion Not Possible | — |
| (Material Properties of Composition) | | | | | | | | |
| Charpy Impact 23° C. | kJ/m$^2$ | 35.0 | 33.5 | 34.0 | 33.0 | 34.0 | | 36.0 |
| −40° C. | kJ/m$^2$ | 14.5 | 13.5 | 13.0 | 12.0 | 12.5 | | 14.5 |
| (Thermal Aging Resistance) | | | | | | | | |
| 120° C. Charpy Impact | kJ/m$^2$ | 21.5 | 19.5 | 18.0 | 18.0 | 19.0 | | 20.0 |
| 500 hr Retention Rate | % | 61 | 58 | 53 | 55 | 56 | | 56 |
| 120° C. Charpy Impact | kJ/m$^2$ | 18.0 | 16.0 | 11.5 | 11.0 | 13.0 | | 17.0 |
| 1000 hr Retention Rate | % | 51 | 48 | 34 | 33 | 38 | | 47 |

TABLE 12-continued

|  |  |  | Comparative Example 14 | Comparative Example 15 | Comparative Example 16 | Comparative Example 17 | Comparative Example 18 | Comparative Example 19 | Comparative Example 20 |
|---|---|---|---|---|---|---|---|---|---|
| Flexural Modulus | ISO178 | MPa | 2400 | 2400 | 2280 | 2280 | 2300 |  | 2300 |
| VSP | ISO306, 10N | °C. |  |  | 145 | 145 | 145 |  | 145 |
| Flame retardancy | UL-94, 0.75 mm | Rank | V-0 | V-0 | V-0 | V-0 | V-0 |  | V-0 |
|  | UL-94, 2.5 mm | Rank | V-0 | V-0 | V-0 | V-0 | V-0 |  | V-0 |
| (Humidity Resistance) |  |  |  |  |  |  |  |  |  |
| 85° C., 85% 2000 hr Retention Rate |  | % | — | 80 | 75 | 75 | 77 |  | 79 |

In Table, "—" indicates that measurement was not carried out.

TABLE 13

| (Molding Conditions: Cylinder Temperature Setting) |  | Example 2 | Example 24 | Example 25 | Comparative Example 21 |
|---|---|---|---|---|---|
| Test Piece for Crushing |  | °C. | — | 280 | 330 | 360 |
| Test Piece for Material Properties |  | °C. | 280 | 280 | 280 | 280 |
| (Material Properties of Composition) |  |  |  |  |  |  |
| Charpy Impact | 23° C. | kJ/m$^2$ | 40.0 | 40.0 | 37.0 | 34.0 |
|  | −40° C. | kJ/m$^2$ | 19.0 | 18.5 | 17.0 | 14.0 |
| (Thermal Aging Resistance) |  |  |  |  |  |  |
| 120° C. | Charpy Impact | kJ/m$^2$ | 29.0 | 28.0 | 26.0 | 19.5 |
| 500 hr | Retention Rate | % | 73 | 70 | 70 | 57 |
| 120° C. | Charpy Impact | kJ/m$^2$ | 25.0 | 23.0 | 20.5 | 16.0 |
| 1000 hr | Retention Rate | % | 63 | 58 | 55 | 47 |
| Flexural Modulus | ISO178 | MPa | 2310 | 2300 | 2300 | 2300 |
| VSP | ISO306, 10N | °C. | 146 | 145 | 145 | 144 |
| Flame retardancy | UL-94, 0.75 mm | Rank | V-0 | V-0 | V-0 | V-1 |
|  | UL-94, 2.5 mm | Rank | V-0 | V-0 | V-0 | V-1 |
| (Humidity Resistance) |  |  |  |  |  |  |
| 85° C., 85% 2000 hr Retention Rate |  | % | 85 | 84 | 80 | 75 |
| CTI |  |  | 0 | 0 | 0 | 1 |

This application is based on Japanese patent application submitted on Feb. 14, 2011 (Japanese Patent Application No. 2011-028870), the contents of which are incorporated herein by reference.

Reference Signs List

1 Connection structure
10 Body
12 Lid
102 Connection portion with an electrical wiring of a solar power generation module
104 Connection portion with an external connection cable
2 Connection structure
20 First connector
22 Second connector
202, 222 Socket portion
204 Connection terminal
206 Lock portion
208, 228 Cable
224 Engagement hole
226 Lock receiving portion

The invention claimed is:

1. A connection structure for a solar power generation module, which links a solar power generation module with a cable for connecting to the solar power generation module, wherein the connection structure comprises a thermoplastic resin composition, the thermoplastic resin composition comprises (A) a polyphenylene ether-based resin, (B) a styrene-based hydrogenated block copolymer, and (C) a phosphate-based flame retardant, in the thermoplastic resin composition, based on a total of 100 parts by mass of (A) and (B), a content of (A) is 70 to 85 parts by mass, a content of (B) is 15 to 30 parts by mass, and a content of (C) is 5 to 30 parts by mass, and the thermoplastic resin composition has a Charpy impact strength at −40° C. of more than 15 kJ/m$^2$, and a Charpy impact strength at 23° C. after the thermoplastic resin composition has been left for 500 hours under a 120° C. environment of 20 kJ/m$^2$ or more, wherein the thermoplastic resin composition is obtained by melt-kneading the raw material components using an extruder, and an oxygen concentration at a first raw material supply port provided upstream of the extruder is 10 volume% or less.

2. The connection structure for the solar power generation module according to claim 1, wherein (C) is a phosphate-based compound represented by the following formula (I) or (II),

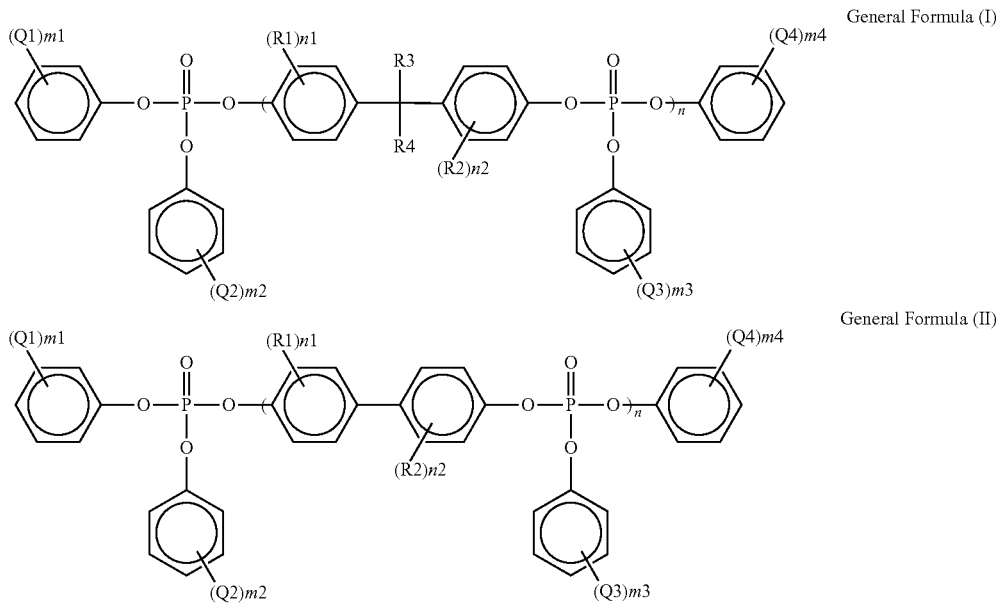

General Formula (I)

General Formula (II)

wherein in formulae (I) and (II),

Q1, Q2, Q3, and Q4 are a substituent respectively and each independently represents an alkyl group having 1 to 6 carbon atoms, R1 and R2 are a substituent respectively and represent a methyl group, R3 and R4 each independently represents a hydrogen atom or a methyl group, n denotes an integer of 1 or more, n1 and n2 each independently denotes an integer from 0 to 2, and m1, m2, m3, and m4 each independently denotes an integer from 0 to 3.

3. The connection structure for the solar power generation module according to claim 1, wherein (B) has a number average molecular weight of 150,000 to 500,000, and is dispersed in the thermoplastic resin composition as a particle, and has a weight average particle size of 0.3 to 1 μm.

4. The connection structure for the solar power generation module according to claim 1, wherein in the thermoplastic resin composition, based on a total of 100 parts by mass of (A) and (B), the content of (A) is 75 to 85 parts by mass and the content of (B) is 15 to 25 parts by mass.

5. The connection structure for the solar power generation module according to claim 1, wherein in the thermoplastic resin composition, based on a total of 100 parts by mass of (A) and (B), the content of (C) is 15 to 25 parts by mass.

6. The connection structure for the solar power generation module according to claim 1, wherein a UL-94 standard flame retardancy level at a thickness of 0.75 to 3.0 mm of the thermoplastic resin composition is rank V-1 or higher.

7. The connection structure for the solar power generation module according to claim 1, wherein a UL-94 standard flame retardancy level at a thickness of 0.75 to 3.0 mm of the thermoplastic resin composition is rank V-0.

8. The connection structure for the solar power generation module according to claim 1, wherein the thermoplastic resin composition has a Charpy impact strength retention rate at 23° C., after being left for 500 hours under a 120° C. environment, of 50% or more based on the Charpy impact strength at 23° C. of the thermoplastic resin composition before being left.

9. The connection structure for the solar power generation module according to claim 1, wherein the thermoplastic resin composition has a Charpy impact strength retention rate at 23° C., after being left for 2,000 hours under a 85° C., 85% relative humidity environment, of 70% or more based on the impact strength at 23° C., of the thermoplastic resin composition before being left.

10. The connection structure for the solar power generation module according to claim 1, wherein the thermoplastic resin composition has a comparative tracking index (CTI) based on UL-746A (ASTM D3638) at a thickness of 3.0 mm of 2 or less.

11. The connection structure for the solar power generation module according to claim 1, wherein the thermoplastic resin composition has a comparative tracking index (CTI) based on UL-746A (ASTM D3638) at a thickness of 3.0 mm of 1 or less.

12. The connection structure for the solar power generation module according to claim 1, wherein the connection structure for the solar power generation module is a connector for a solar power generation module.

13. The connection structure for the solar power generation module according to claim 1, wherein the thermoplastic resin composition comprises a thermoplastic resin composition obtained by crushing a connection structure for a solar power generation module.

\* \* \* \* \*